US012712632B2

(12) United States Patent
Darabi et al.

(10) Patent No.: US 12,712,632 B2
(45) Date of Patent: Aug. 18, 2026

(54) REINFORCEMENT LEARNING BASED SATELLITE CONTROL

(71) Applicant: WILDSTAR, LLC, Saratoga, CA (US)

(72) Inventors: Amirebrahim Darabi, San Francisco, CA (US); Yu Zou, Los Gatos, CA (US)

(73) Assignee: WildStar LLC, Arlington, TX (US)

( * ) Notice: Subject to any disclaimer, the term of this patent is extended or adjusted under 35 U.S.C. 154(b) by 70 days.

(21) Appl. No.: 18/796,386

(22) Filed: Aug. 7, 2024

(65) Prior Publication Data

US 2025/0183998 A1 Jun. 5, 2025

Related U.S. Application Data

(60) Provisional application No. 63/606,071, filed on Dec. 4, 2023.

(51) Int. Cl.
*H04B 7/185* (2006.01)
*G06N 3/092* (2023.01)

(52) U.S. Cl.
CPC ......... *H04B 7/18519* (2013.01); *G06N 3/092* (2023.01)

(58) Field of Classification Search
CPC ...... H04B 7/18519; G06N 3/092; G06N 3/00; G06N 3/08; G06N 3/084; B64G 1/244; B64G 1/247
See application file for complete search history.

(56) References Cited

U.S. PATENT DOCUMENTS

2018/0032864 A1* 2/2018 Graepel ............... G06N 3/0464

FOREIGN PATENT DOCUMENTS

| | | |
|---|---|---|
| CN | 110501920 A | 11/2019 |
| CN | 108491610 B | 12/2021 |
| CN | 114889848 A | 8/2022 |
| CN | 116692027 A | 9/2023 |
| CN | 114167751 B | 1/2024 |
| CN | 117556625 A | 2/2024 |

(Continued)

OTHER PUBLICATIONS

Gao, (Satellite Attitude Control with Deep Reinforcement Learning, 2020). (Year: 2020).*

(Continued)

*Primary Examiner* — Abby Lin
*Assistant Examiner* — Renee LaRose
(74) *Attorney, Agent, or Firm* — Erin P. Madill

(57) ABSTRACT

The disclosed technology is generally directed to a method for controlling a satellite. In one example of the technology, the method may include receiving a set of parameters associated with an orientation of the satellite and executing a reinforcement learning model to control the orientation of the satellite to stabilize the satellite based on each of the set of parameters. The executing of the reinforcement learning model includes predicting a set of actions to be executed by the satellite to control the orientation of the satellite based on each of the set of parameters, executing the set of actions, and predicting an outcome of the executing of the set of actions to generate a set of rewards. The method may further include controlling the orientation of the satellite to stabilize the satellite based on the set of actions and the set of rewards.

21 Claims, 19 Drawing Sheets

(56) References Cited

FOREIGN PATENT DOCUMENTS

WO 2017195202 A1 11/2017

OTHER PUBLICATIONS

International Application No. PCT/US2024/060371, International Search Report and Written Opinion mailed Apr. 10, 2025, 19 pages.
Elkins et al., "Autonomous Spacecraft Attitude Control Using Deep Reinforcement Learning," XP093271008, Oct. 1, 2020, pp. 1-14.
Ravaioli et al., "Safe Reinforcement Learning Benchmark Environments for Aerospace Control Systems," 2022 IEEE Aerospace Conference (AERO), IEEE, Mar. 5, 2022, pp. 1-20.
Tammam et al., "Deep Reinforcement Learning for Rendezvous and Attitude Control of CubeSat Class Satellite," 2023 7th International Conference on Automation, Control and Robots (ICACR), IEEE, Aug. 4, 2023, pp. 1-7.
Schram et al., "Neurocontrol by Reinforcement Learning," Journal "A" Publicarto N.V. BE, vol. 37, No. 3, Oct. 1, 1996, pp. 59-64.
Tipaldi et al., "Reinforcement Learning in Spacecraft Control Applications: Advances, Prospects, and Challenges—ScienceDirect," Annual reviews in Control, vol. 54, Jan. 1, 2022, pp. 1-23.
International Application No. PCT/US2024/041157, International Search Report and Written Opinion mailed May 8, 2025, 19 pages.

* cited by examiner 100
120
120A
120B
120C
120D
120E
120F
120G
120H
120I
130A
130B
130C
140
110
110A
110B
110C
110D
110E
110F
110G
110H
110I
110J
110K
110L

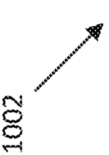

A

1012 Predict a set of actions based on each of the set of parameters to be implemented by the satellite to control the orientation of the satellite 1014 Implementing the set of actions 1016 Predict an outcome of the implementing of the set of actions to generate a set of rewards 1018 Compare the outcome of the implementing of the set of actions and a desired outcome 1020 Reduce a value of each of the set of angular rates such that each of the set of angular rates is within a first predefined threshold 1022 Reduce a value of each of the set of Euler angles when each of the set of angular rates is within the first predefined threshold such that each of the set of Euler angles is within a second predefined threshold FIG. 10B (continued)

REINFORCEMENT LEARNING BASED SATELLITE CONTROL

CROSS REFERENCE TO RELATED APPLICATIONS

This application claims the benefit of U.S. Provisional Application Ser. No. 63/606,071, filed on Dec. 4, 2023, the disclosure of which is incorporated herein by reference.

TECHNICAL FIELD

This disclosure is directed to satellite control systems, and more particularly, to reinforcement learning based satellite control systems.

BACKGROUND

Satellites have become indispensable tools for various applications, including communication, Earth observation, navigation, and scientific research. The performance and functionality of the satellites rely on their precise control and stability while orbiting the Earth or other celestial bodies. Achieving and maintaining control and stability are paramount to ensure the satellite's proper functioning and longevity.

Satellites are normally designed to follow specific orbits. Controlling and stabilizing a satellite's position and trajectory within these orbits is important for a number of reasons including to ensure consistent coverage and data acquisition. Further, maintaining a satellite's attitude, or orientation in space, is important for achieving the desired results or mission objectives. Attitude control systems manage the satellite's orientation, ensuring that its cameras, sensors, antennas, solar panels, and/or instruments are properly oriented or aligned. For instance, in the context of a communications satellite, ensuring proper orientation or alignment of the antennas may be important for providing optimal communication coverage.

Satellites are exposed to various external forces, such as gravitational forces, solar radiation pressure, and atmospheric drag. To maintain the satellites in respective orbits and prevent undesired rotations or drift, many satellites rely on onboard systems and mechanisms for control and stabilization. The primary control systems and mechanisms of a satellite can include one or more of reaction wheels, magnetic torquers, thrusters, gyroscopes, star trackers, sun sensors, Earth sensors, Global Positioning System (GPS) receivers, and deployable structures. Further, the satellites may need to perform maneuvers, such as orbit adjustments or orbital transfers, during their assigned tasks. Precise control over these maneuvers is essential to reach specific orbits or perform station-keeping tasks, mitigating radiation exposure, and extending the operational lifespan of the satellite. In the case of constellations or networks of interconnected satellites, stability and control of the satellites is essential for maintaining continuous communication links between satellites.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, an exemplary embodiment of the present disclosure may provide a method for controlling a satellite. Implementations of the described techniques may include hardware, a method or process, or a non-transitory, a computer readable medium, etc. Other embodiments of this aspect include corresponding computer systems, apparatus, and computer programs recorded on one or more computer storage devices, each configured to perform the actions of the methods. The system may include one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features.

The method may include receiving a set of parameters associated with an orientation of the satellite, and executing, based on each of the set of parameters, a reinforcement learning model to control the orientation of the satellite to stabilize the satellite. The executing of the reinforcement learning model may include: predicting, based on each of the set of parameters, a set of actions to be executed by the satellite to control the orientation of the satellite; executing the set of actions; and predicting an outcome of the executing of the set of actions to generate a set of rewards. The method may furthermore include controlling, based on the set of actions and the set of rewards, the orientation of the satellite to stabilize the satellite. Other embodiments of this aspect include corresponding computer systems, apparatus, and computer programs recorded on one or more computer storage devices, each configured to perform the actions of the methods.

Implementations may include one or more of the following features. In some implementations, the set of parameters may include: a set of angular rates; and a set of Euler angles. In some implementations, the executing of the reinforcement learning model to control the orientation of the satellite to stabilize the orientation of the satellite, may further include: reducing, by an omega agent, a value of each of the set of angular rates such that each of the set of angular rates is within a first predefined threshold; and reducing, by an Euler agent when each of the set of angular rates is within the first predefined threshold, a value of each of the set of Euler angles such that each of the set of Euler angles is within a second predefined threshold. In some implementations, the omega agent and the Euler agent execute the reinforcement learning model to reduce the values of the set of angular rates within the first predefined threshold and the set of Euler angles within the second predefined threshold. In some implementations, the omega agent and the Euler agent are each based on an actor-critic network, where each actor-critic network may include: an actor network; and a critic network.

In some implementations, the reducing, by the omega agent, the value of each of the set of angular rates may further include: inputting the set of parameters into an actor network, where the set of parameters include the set of angular rates, a set of quaternions, and a position of the satellite; processing, by the actor network, the set of parameters based on a policy to predict the set of actions; executing the set of actions to determine the set of parameters of the satellite after executing the set of actions; storing the set of parameters of the satellite after executing the set of actions in an experiment buffer; adding noise to the set of actions; inputting the set of parameters and the set of actions with added noise into a critic network; and predicting, by the critic network, the outcome of the executing of the set of actions to generate the set of rewards, where the set of rewards is generated by comparing the outcome of the executing of the set of actions with a desired outcome.

In some implementations, the reducing, by the Euler agent, the value of each of the set of Euler angles may further include: inputting the set of parameters into an actor network, where the set of parameters include the set of angular rates, a set of quaternions, and a position of the satellite; processing, by the actor network, the set of parameters based on a policy to predict the set of actions; executing the set of actions to determine the set of parameters of the satellite; storing the set of parameters of the satellite after executing the set of actions in an experiment buffer; adding noise to the set of actions; inputting the set of parameters and the set of actions with added noise into a critic network; and predicting, by the critic network, the outcome of the executing of the set of actions to generate the set of rewards, where the set of rewards is generated by comparing the outcome of the executing of the set of actions with a desired outcome.

In some implementations, the reinforcement learning model is based on an actor-critic model such as an actor-critic deep deterministic policy gradient model. Alternatively, the reinforcement learning model may be based on any of Proximal Policy Optimization (PPO), Twin Delayed DDPG (TD3), Trust Region Policy Optimization (TRPO), Soft Actor-Critic (SAC), Advantage Actor-Critic (A2C), Deep Q-Network (DQN), Asynchronous Advantage Actor-Critic (A3C), Trust Region Policy Optimization with Proximal Policy Optimization (TRPO-PPO), Deterministic Policy Gradient (DPG), Continuous Actor-Critic Learning Automaton (CACLA), Generalized Advantage Estimation (GAE), Normalized Advantage Functions (NAF), Deep Deterministic Policy Gradients from Demonstrations (DDPGfD), Policy Gradient with Parameter-Based Exploration (PGPE), Natural Actor-Critic (NAC), Maximum a Posteriori Policy Optimization (MPO), Stochastic Value Gradient (SVG), Deep Episodic Value Iteration (DEVI), Distributed Distributional Deterministic Policy Gradients (D4PG), REINFORCE with Baseline models, etc.

In some implementations, the method may further include processing each of the set of actions to generate control signals for controlling the orientation of the satellite to stabilize the satellite when operating in a specific orientation scenario.

In some implementations, the set of rewards may be generated by comparing the outcome of the executing of the set of actions and a desired outcome. When the outcome of executing a first action of the set of actions is within a predefined range of the desired outcome, a value of a first reward of the set of rewards corresponding to the first action is high. When the outcome of executing the first action of the set of actions exceeds the predefined range of the desired outcome, the value of the first reward of the set of rewards corresponding to the first action is low.

In another general aspect, a method may be provided for implementing a reinforcement learning model for controlling a satellite. The method may include receiving a set of parameters associated with an orientation of the satellite, and implementing, based on each of the set of parameters, the reinforcement learning model to control the orientation of the satellite to stabilize the satellite. The implementing of the reinforcement learning model may include: predicting, based on each of the set of parameters, a set of actions to be implemented by the satellite to control the orientation of the satellite; implementing the set of actions; and predicting an outcome of the implementing of the set of actions to generate a set of rewards. The orientation of the satellite is controllable, based on the set of actions and the set of rewards, to stabilize the satellite. Other embodiments of this aspect include corresponding computer systems, apparatus, and computer programs recorded on one or more computer storage devices, each configured to perform the actions of the methods.

Implementations may include one or more of the following features. In some implementations, the set of parameters may include: a set of angular rates; and a set of Euler angles. In some implementations, implementing the reinforcement learning model to control the orientation of the satellite to stabilize the orientation of the satellite, may further include: reducing, by an omega agent, a value of each of the set of angular rates such that each of the set of angular rates is within a first predefined threshold; and reducing, by an Euler agent when each of the set of angular rates is within the first predefined threshold, a value of each of the set of Euler angles such that each of the set of Euler angles is within a second predefined threshold. In some implementations, the omega agent and the Euler agent execute the reinforcement learning model to reduce the values of the set of angular rates within the first predefined threshold and the set of Euler angles within the second predefined threshold. In some implementations, the omega agent and the Euler agent are each based on an actor-critic network, and where each actor-critic network may include: an actor network and a critic network.

In some implementations, the reducing, by the omega agent, the value of each of the set of angular rates may further include: sampling a first subset of parameters of the set of parameters from a demonstration buffer and a second subset of parameters of the set of parameters from an experiment buffer, where the set of parameters include the set of angular rates, a set of quaternions, and a position of the satellite; inputting the set of parameters into an actor network; processing, by the actor network, the set of parameters based on a policy to predict the set of actions; simulating, by a simulation environment processor, the set of actions to determine the set of parameters of the satellite after executing the set of actions; storing the set of parameters of the satellite after executing the set of actions in the experiment buffer; adding noise to the set of actions; inputting the set of parameters and the set of actions with added noise into a critic network; and predicting, by the critic network, the outcome of the implementing of the set of actions to generate the set of rewards, where the set of rewards is generated by comparing the outcome of the implementing of the set of actions with a desired outcome.

In some implementations, the reducing, by the Euler agent, the value of each of the set of Euler angles may further include: sampling the set of parameters from an experiment buffer, where the set of parameters include the set of angular rates, a set of quaternions, and a position of the satellite; inputting the set of parameters and a set of control actions into an actor network, where the set of control actions are generated by a controller; processing, by the actor network, the set of parameters and the set of control actions based on a policy to predict the set of actions and a weight value; simulating, by a simulation environment processor, the set of actions and the set of control actions based on the weight value to determine the set of parameters of the satellite after executing the set of actions and the set of control actions; storing the set of parameters of the satellite after executing the set of actions and the set of control actions in the experiment buffer; adding noise to the set of actions; inputting the set of parameters and the set of actions with added noise into a critic network; and predicting, by the critic network, the outcome of the implementing of the set of actions to generate the set of rewards, where the set of rewards is generated by comparing the outcome of the implementing of the set of actions with a desired outcome.

In some implementations, the reinforcement learning model is based on an actor-critic model such as an actor-critic deep deterministic policy gradient model.

In some implementations, the implementing of the reinforcement learning model may further include: capturing, by a simulation environment processor, a plurality of trajectories for the satellite during different orientation scenarios in different simulation environments, where each trajectory may include data that represents a particular orientation of the satellite at a particular time; retrieving, by the reinforcement learning model, a set of trajectories of the satellite; and processing, by the reinforcement learning model, the set of trajectories of the satellite to learn and generate the set of parameters that describe the orientation of the satellite, where the set of parameters are processible by an agent to generate the set of actions for controlling the satellite. In some implementations, the different orientation scenarios correspond to different initial values of omega associated with the satellite.

In some implementations, the set of rewards are generated by comparing the outcome of the implementing of the set of actions and a desired outcome. When the outcome of implementing a first action of the set of actions is within a predefined range of the desired outcome, a value of a first reward of the set of rewards corresponding to the first action is high. By contrast, when the outcome of implementing the first action of the set of actions exceeds the predefined range of the desired outcome, the value of the first reward of the set of rewards corresponding to the first action is low.

Further aspects, features, applications, and advantages of the disclosed technology, as well as the structure and operation of various examples, are described in detail below with reference to the accompanying drawings. It is noted that the disclosed technology is not limited to the specific examples described herein. Such examples are presented herein for illustrative purposes only. Additional examples will be apparent to persons skilled in the relevant art(s) based on the teachings contained herein.

BRIEF DESCRIPTION OF THE SEVERAL VIEWS OF THE DRAWINGS

For a better understanding of the present disclosure, non-limiting and non-exhaustive examples of the present disclosure are described with reference to the following drawings, in which:

FIGS. 2A and 2B are diagram illustrating a top and front views of one non-limiting example of satellite in which aspects of the technology may be practiced;

In the drawings, similar reference numerals refer to similar parts throughout the drawings unless otherwise specified. These drawings are not necessarily drawn to scale.

DETAILED DESCRIPTION

Figure 1:
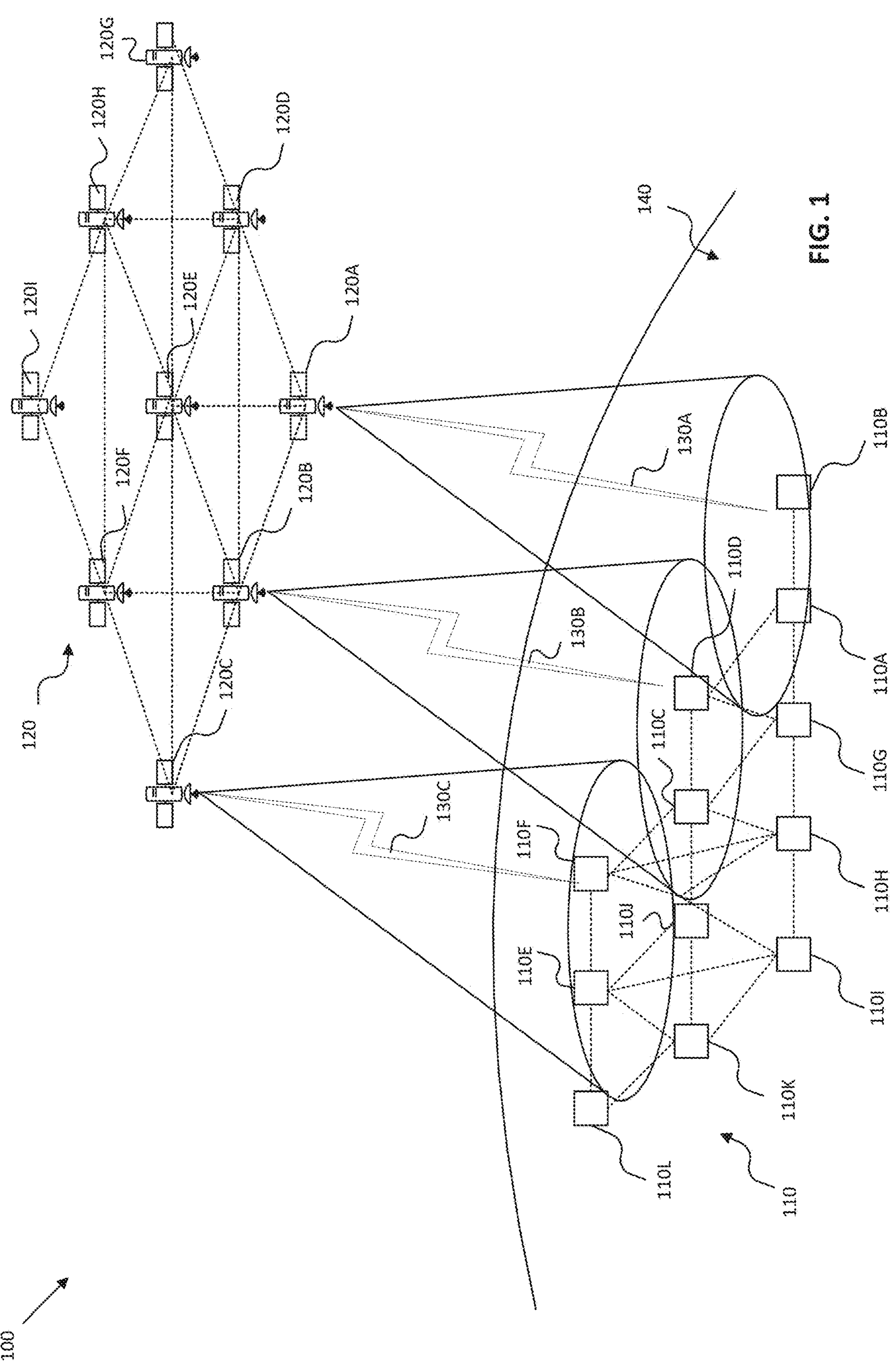
FIG. 1 is a simplified diagram illustrating a satellite system in which aspects of the technology may be employed.

Technologies are provided for controlling an orientation of a satellite to stabilize the satellite. Technologies are also provided for training a reinforcement learning model and executing the trained reinforcement learning model to control the satellite. The specification and accompanying drawings disclose one or more exemplary embodiments that incorporate the features of the present disclosure. The scope of the present disclosure is not limited to the disclosed embodiments. The disclosed embodiments merely exemplify the present disclosure, and modified versions of the disclosed embodiments are also encompassed by the present disclosure. Embodiments of the present disclosure are defined by the claims appended hereto.

It is noted that any section/subsection headings provided herein are not intended to be limiting. Any embodiments described throughout this specification, and disclosed in any section/subsection may be combined with any other embodiments described in the same section/subsection and/or a different section/subsection in any manner.

Implementations of the techniques described herein may include hardware, a method or process, or a non-transitory computer readable medium, etc. Other embodiments of this aspect include corresponding computer systems, apparatus, and computer programs recorded on one or more computer storage devices, each configured to perform the actions of the methods. The system may include one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations may include one or more of the following features. Prior to describing exemplary embodiments that incorporate the features of the present disclosure, a discussion of security concepts that are appliable to the exemplary embodiments will be provided.

Satellites are integral components for various applications, including communication, Earth observation, and scientific research, but precise control and stability of the satellites is important for their functionality and longevity. The functions primarily involve managing satellite orbits, controlling orientation (attitude) of the satellites, and ensuring stability against external forces. As used herein, the term "attitude" refers to the orientation or position of the satellite with respect to a reference frame, typically the celestial sphere or the Earth. The attitude of a satellite describes how the satellite is pointed in space and is characterized by its angular position along three principal axes called the roll axis, pitch axis and yaw axis. Attitude may be specified using a set of Euler angles or direction cosines that define how the satellite is oriented in three-dimensional space. These angles describe the rotations needed to transform the satellite's coordinate system to a fixed reference frame, such as the Earth-centered inertial frame.

Additionally, the satellites may need to perform maneuvers, maintain safety, and support continuous communication with ground terminals and/or other satellites. Technological advancements in satellite control and stabilization systems may enhance or improve the reliability and performance in various tasks, from telecommunications to space exploration and scientific research.

Utilization of machine learning may improve such satellite control systems by enabling accurate orbit prediction, autonomous maneuvers, real-time attitude control, anomaly detection, efficient communication, collision avoidance, predictive maintenance, resource management, mission planning, and space weather prediction. Machine learning driven advancements may optimize satellite operations, extend their lifespan, improve data collection, enhance communication efficiency, ensure safety, and enable proactive maintenance, contributing to the overall effectiveness of satellites in applications ranging from telecommunications to Earth observation and space exploration.

Reinforcement Learning

Reinforcement learning (RL) is a branch of machine learning focused on training agents to make sequential decisions in an environment to maximize cumulative rewards. RL models have shown remarkable capabilities in solving complex decision-making problems and have been successfully applied to various domains, including game playing, robotics, autonomous driving, and resource management. A RL model encompasses the key components of an RL system, including the agent, the environment, and the learning algorithm.

RL models allow agents to learn from interaction with the environment, generalize their knowledge, and adapt to dynamic scenarios. An agent may interact with the environment, receive observations or states, take actions, and receive feedback in the form of rewards or penalties. The agent's objective is to learn an optimal policy that maps states to actions, maximizing the expected cumulative rewards over time. The policy can be deterministic (e.g., producing a specific action for each state) or stochastic (e.g., producing a probability distribution over actions).

The environment may represent the external system or problem the agent interacts with. The environment may be a simulated environment in a computer program, a physical system, or even a complex real-world scenario. The environment may provide feedback to the agent in the form of rewards, which indicate the desirability of the agent's actions, and the environment may transition between states based on the actions taken.

The learning algorithm is responsible for updating the agent's policy based on its experiences. One commonly used RL algorithm is Q-learning, which uses a value function to estimate the quality of state-action pairs. The value function represents the expected cumulative rewards an agent can obtain from a particular state-action pair. Q-learning may update the value function iteratively based on the difference between the predicted and actual rewards obtained during exploration.

To explore the state-action space efficiently, RL models often employ exploration-exploitation strategies. During the exploration phase, the agent may take actions to gather more information about the environment and learn the consequences of actions performed by the agent. In the exploitation phase, the agent may use its learned policy to make decisions that maximize rewards based on the current knowledge of the agent.

In addition to Q-learning, other RL algorithms exist, such as policy gradient methods, which directly optimize the policy without using a value function, and actor-critic methods, which combine policy-based and value-based approaches. The success of a reinforcement learning model depends on various factors, including the choice of algorithms, the representation of states and actions, the design of reward structures, and the exploration-exploitation trade-off.

Actor-Critic Network

An actor-critic network is a type of architecture commonly used in reinforcement learning (RL) algorithms. It combines both policy-based and value-based approaches to reinforcement learning. In RL, an agent interacts with an environment, observes its state, takes actions, and receives rewards or feedback. The goal of the agent is to learn an optimal policy that maximizes its cumulative rewards over time.

In an actor-critic network, there are two main components: an actor and a critic. The actor is responsible for learning and improving the policy. It takes the current state of the environment as input and outputs the probability distribution over possible actions. The actor explores and suggests actions based on its policy. It seeks to maximize the expected rewards by selecting actions that are likely to lead to higher cumulative rewards. The critic is responsible for estimating the value or quality of the state-action pairs. It evaluates the actions suggested by the actor and provides feedback on their desirability. The critic approximates the expected cumulative rewards or the value function. It helps in assessing the performance of the actor and guides its learning by providing feedback signals to update the policy.

The actor and critic components work together in an iterative process. The actor uses the feedback from the critic to update its policy, aiming to improve its action selection. The critic's estimation of the value function is refined by comparing its predictions to the actual rewards received from the environment. The actor-critic architecture combines the advantages of both policy-based and value-based methods. The actor allows for direct exploration of the action space, while the critic provides a baseline for evaluating the actor's actions. This combination helps in reducing the variance of the policy gradients and facilitates more stable and efficient learning. Different variations and algorithms exist within the actor-critic framework, such as Advantage Actor-Critic (A2C) or Proximal Policy Optimization (PPO), each with their specific modifications and enhancements.

Technical Problem with Conventional Satellite Control Methods

In the field of satellite control, conventional methods face an array of complex technical challenges that have become increasingly pronounced in modern satellite systems. One of the technical issues is the reliance on classical control processes and methodologies. This challenge is further compounded by the expanding population of satellites in orbit. Moreover, the limited adaptability of traditional control processes and methodologies poses a significant roadblock to addressing evolving mission requirements or swiftly responding to unforeseen events.

Satellites may face several challenges related to tumbling and attitude control. Tumbling may occur when a satellite loses its stable orientation and begins to rotate uncontrollably. Tumbling can be caused by various factors, such as external forces (like atmospheric drag), component failures, or impact with micrometeoroids. Tumbling can disrupt satellite functionality, making it challenging to maintain accurate position and communication, leading to uneven wear and tear on components. Attitude control may refer to the satellite's ability to maintain a specific orientation or attitude in space. Accurate attitude control is important for navigation, as satellites must point their antennas or sensors accurately. Challenges in attitude control can arise from several factors, including: external disturbances such as atmospheric drag and gravitational variations, internal system failures such as failures in reaction wheels or thrusters, and solar radiation pressure exerted by sunlight causing small but continuous forces on the satellite, affecting its attitude.

As satellite networks continue to expand, the scalability of traditional control methods becomes an issue, making it difficult to effectively manage the extensive constellations. Importantly, the degree of autonomy in traditional satellite control systems often falls short of what is required for satellites to adapt to dynamic conditions, make real-time decisions, and execute complex missions with optimal efficiency. To address these multifaceted technical challenges, it would be desirable to provide improved control methods for controlling and stabilizing satellites that are automated and adaptable.

In accordance with the disclosed embodiments, reinforcement learning may be utilized for satellite control to address the challenges of the traditional control methods. Based on a set of parameters, a reinforcement learning model may be executed to control the orientation of the satellite to stabilize the satellite. Notably, the reinforcement learning model utilizes two agents, which are referred to herein as: the "omega agent" and the "Euler agent," each being tailored to tackle specific facets of a satellite control problem.

In accordance with the disclosed embodiments, the omega agent may be designed to bring angular velocities across all dimensions below a critical threshold (e.g., 0.01 rad/s) to control and reduce tumbling of the satellite. The omega agent may employ actor-critic networks and is initialized with pre-trained controller demonstrations. Based on a set of input parameters the omega agent may generate a set of actions for controlling the satellite. Further based on the set of actions, the omega agent may generate the reward function such that the reward function provides substantial rewards when angular velocities approach near to the expected values. By skillfully utilizing reinforcement learning, the omega agent demonstrates an aptitude for swiftly and effectively mitigating deviations in angular velocity, ensuring the satellite operates with precision and stability.

In accordance with the disclosed embodiments, when the angular velocities are within the defined thresholds, the satellite control system may seamlessly transition to the Euler agent. The Euler agent is adept at driving the Euler angles to the expected positions, adding an extra layer of control and refinement to the satellite's orientation or attitude. Like the omega agent, the Euler agent may be implemented using an actor-critic architecture. The Euler agent may act together with an existing B-dot controller and dynamically learns a parameter "G" to balance actions between the Euler agent and the controller to achieve improved or optimal results. The reward mechanism of the Euler agent, similar to the omega agent, encourages the Euler agent to maintain angular velocities in close proximity to the expected values, with additional rewards granted when the Euler angles in all dimensions are within the desired threshold (e.g., less than 1.14 degrees), signifying a high level of satellite stability.

The disclosed embodiments may provide the ability for the satellite control system to seamlessly switch between the omega agent and the Euler agent during the satellite's stabilization process. This transition is executed as the system works to bring both Euler angles and angular velocities within their respective expected values. This dynamic interplay between the two agents may ensure precise satellite stabilization and control while demonstrating the versatility and adaptability. The combination of reinforcement learning, and the dual-agent approach addresses the multifaceted challenges of satellite control.

Having given this description of a system for controlling satellites that can be applied within the context of the present disclosure, technologies will now be described for controlling the orientation of the satellites by controlling various parameters of the satellites will now be described with reference to FIGS. 1-12.

FIG. 1 is a simplified diagram illustrating a satellite system 100 in which aspects of the technology may be employed. The satellite system 100 includes multiple user equipment (UE) 110, such as UEs 110A-110L, that are in communication with each other via communication links (as represented by the dotted lines that interconnect each of the UEs 110 in this simplified diagram), and a constellation of satellites 120, such as satellites 120A-1201, that are in communication with each other via intersatellite communication links (as represented by the dotted lines that interconnect each of the satellites 120 in this simplified diagram), and in communication with one or more of the UE 110 (as represented by the communication links 130 between satellite 120C/UE 110F, satellite 120B/UE 110D and satellite 120A/UE 110B in this simplified diagram). The constellation of satellites 120 includes a group of artificial satellites that are positioned in a number of different orbits around the Earth 140 to provide specific services or coverage. For instance, the satellites 120 may work together to offer communication, navigation, and/or remote sensing services to a wide geographic area on Earth 140. The constellation of satellites 120 may include any number of satellites to ensure global coverage and to provide redundancy in case of failure. As such, it should be appreciated that while only nine satellites and twelve UEs are illustrated in this simplified diagram due to page constraints, in actual satellite systems the number of satellites in the constellation and number of UEs is much larger. In this regard, the constellation of satellites may include any number of satellites that are configured in any number of orbits with any number of satellites in each orbit. For sake of illustration, in this highly simplified example, the constellation of satellites that may include three orbits with three satellites in each of the three orbits. It should be appreciated that such satellite constellations can be arranged in different configurations, including low Earth orbit (LEO), medium Earth orbit (MEO), or geostationary orbit (GEO), depending on the intended application and the desired level of coverage and service.

Each of the satellites 120 is an artificial object placed in orbit around a celestial body, often referring to Earth 140. Each satellite typically includes various components such as a communication or scientific payload, power systems (such as solar panels), propulsion for orbit adjustments, and communication equipment to transmit and receive data to and from Earth 140.

The UEs 110 may be deployed at different locations in a geographic area that includes, for example, a forest, an agricultural land, or the like. In one embodiment, for example, the UEs 110 are positioned at different locations in certain geographic area to provide sensor coverage over part of or substantially all of the area. The UEs 110 may also be referred to as a mobile device, a wireless device, a remote device, a handheld device, or a subscriber device, or some other suitable terminology, where the "device" may also be referred to as a unit, a station, a terminal, or a client. The UE 110 may also be a personal electronic device such as a cellular phone, a personal digital assistant (PDA), a tablet computer, a laptop computer, or a personal computer. In some examples, the UE 110 may also refer to a wireless local loop (WLL) station, an Internet of Things (IoT) device, an Internet of Everything (IoE) device, or a machine type communication (MTC) device, or the like, which may be implemented in various articles such as appliances, vehicles, meters, or the like.

Satellites

Figures 2A, 2B:
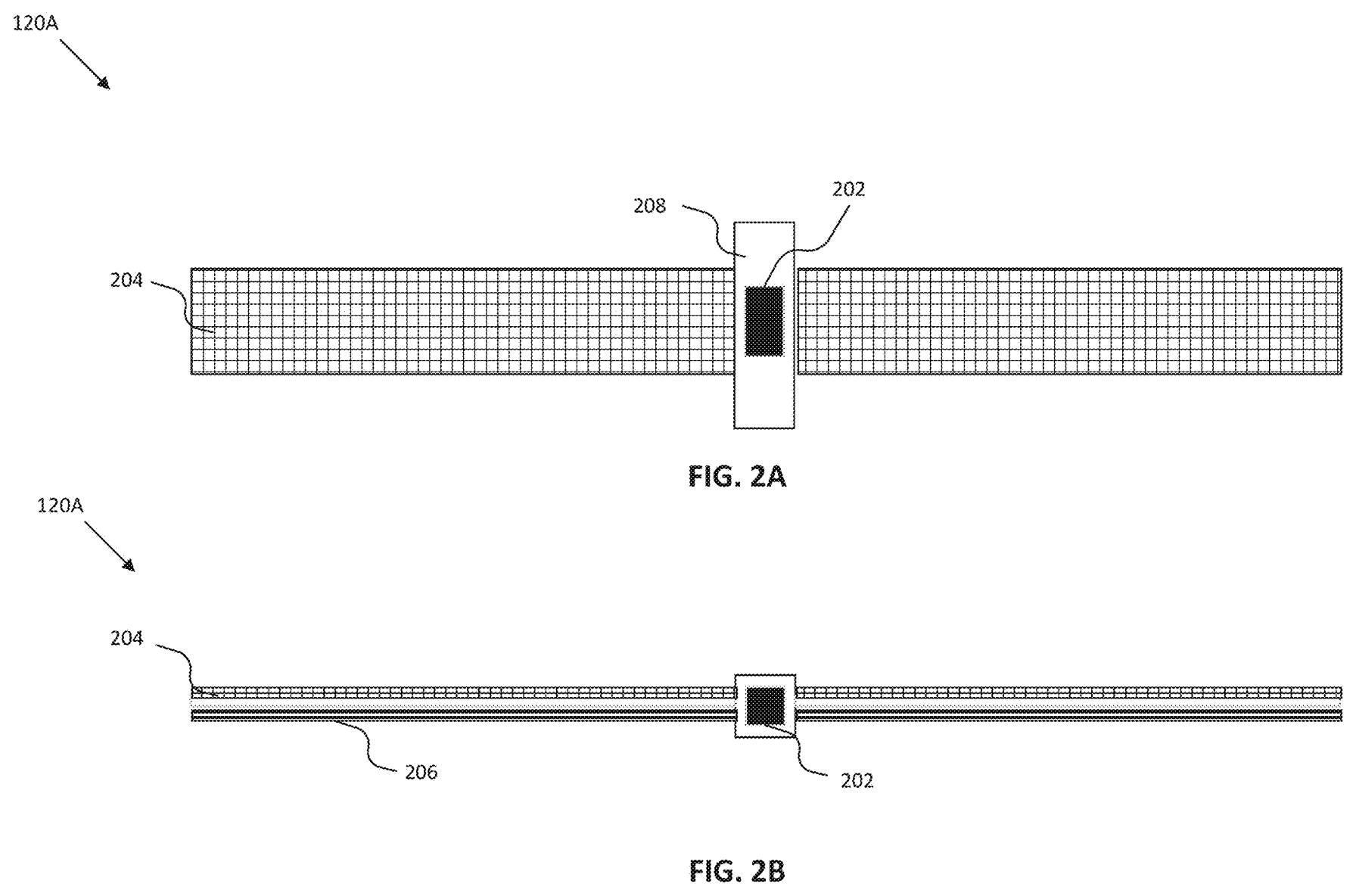
Figure 2C:
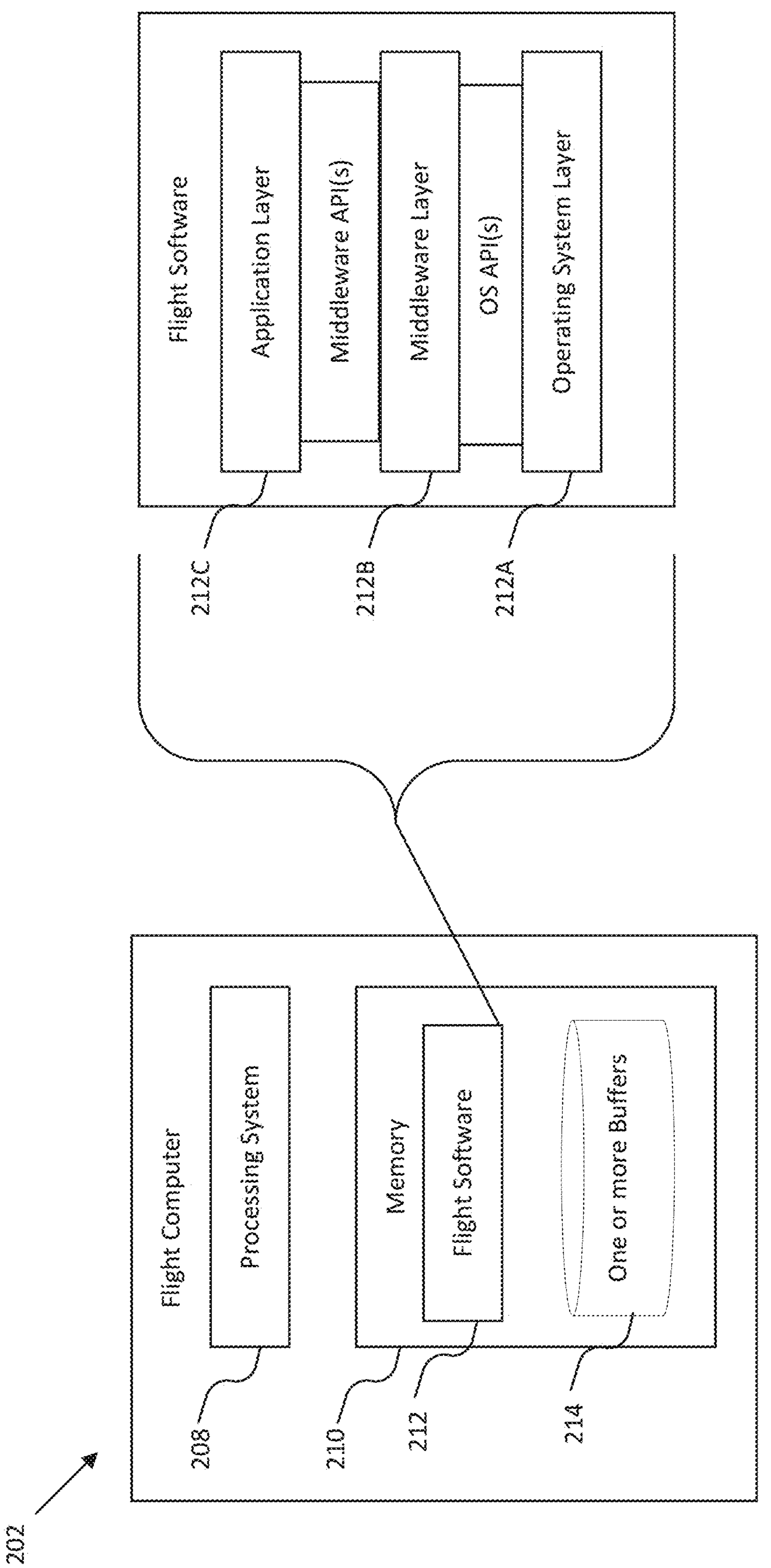
FIG. 2C is a block diagram illustrating one non-limiting example of a flight computer of satellite in which aspects of the technology may be practiced.

FIGS. 2A and 2B are diagrams illustrating a top and front views of one non-limiting example of satellite 120A in which aspects of the technology may be practiced. The satellite 120A may include a flight computer 202, solar panels 204, and multiple antennas 206. FIG. 2C is a block diagram illustrating one non-limiting example of a flight computer 202 of satellite 120A in which aspects of the technology may be practiced. The flight computer 202 can refer to a computer that is on board a satellite and is sometimes referred to as a command and data handling (CDH) subsystem. The flight computer 202 is responsible for making the major decisions on the satellite. For example, flight computer 202 communicates with other subsystems on board to keep track of the processes going on in the satellite. The flight computer 202 is the link to peripheral hardware and acts as the central entity for sending commands and collecting all housekeeping information. The flight computer 202 may collect data from other subsystems (not illustrated for sake of simplicity), read the data coming in from the various sensors (not illustrated for sake of simplicity), process this data and take any required actions. The flight computer 202 may also have an operating system installed that can manage the various programs.

Solar panels 204 on the satellite 120A are essential components that convert sunlight into electrical power. Solar panels 204 provide sustainable energy to run satellite systems, store excess power in batteries for use during darkness, and are lightweight for efficient launches. Antennas 206 may be used to employ techniques such as transmit diversity, receive diversity, multiple-input multiple-output (MIMO) communications, and/or beamforming. For example, the system 100 may utilize a transmission scheme between a transmitting device and a receiving device, where the transmitting device is equipped with multiple antennas and the receiving devices are equipped with one or more antennas.

In the embodiment illustrated in FIG. 20, the flight computer 202 includes a processing system 208, and a memory 210 that stores code that is executable by the processing system 208. The code stored in memory 210 includes code to implement various features of flight software 212, which may also be referred to as flight control software. Flight software 212 is operated by the flight computer 202 to serve as the "brain" of the satellite. For example, flight software 212 may run on a processor embedded in a satellite's avionics. The name "flight software" reflects the location where it executes, i.e., in the satellite, to differentiate from "ground software," which runs in the ground segment. Flight software 212 enables the satellite to perform all operations necessary to facilitate the mission objective(s) and perform maintenance tasks for the satellite. For instance, flight software 212 is responsible for managing on-board activities, data processing and satellite health and safety. It is considered a high-risk system because it interacts directly with satellite hardware, controlling virtually most of the onboard systems (not illustrated) in real time at various levels of automation.

The flight software 212 can vary depending on the implementation. In general, flight software 212 may include an operating system (OS) layer 212A that interfaces with a middleware layer 212B via OS application programming interfaces (APIs), and an application layer 212C that interfaces with the middleware layer 212B via middleware application programming interfaces (APIs). The OS APIs may be encapsulated, and a uniform Application Program Interface (API) may be provided by the OS layer 212A. Any operating system that supports this uniform API can be used in the avionics system. The middleware layer 212B serves as a common service platform between the operating system layer 212A and application layer 212C. The middleware layer 212B has standard program interfaces and protocols and can realize the data exchange and cross support among different hardware and operating system. The application layer 212C includes any mission application software or "mission applications." The application layer 212C includes most of the common functions of avionics system. The implementation of this layer may be different for different projects.

The memory 210 may further include one or more buffers 214. Each buffer may correspond to a temporary storage area in the memory 210 used in computing and data processing systems to hold and manage data temporarily. Each buffer helps balance the flow of data between different components of the system, ensuring data moves smoothly and efficiently, even when the components operate at different speeds. One or more buffers 214 can be used for purposes like data storage, error handling, data smoothing, load balancing, synchronization, and caching. The one or more buffers 214 may store the data collected by the flight computer 202 from other subsystems.

Figure 2D:
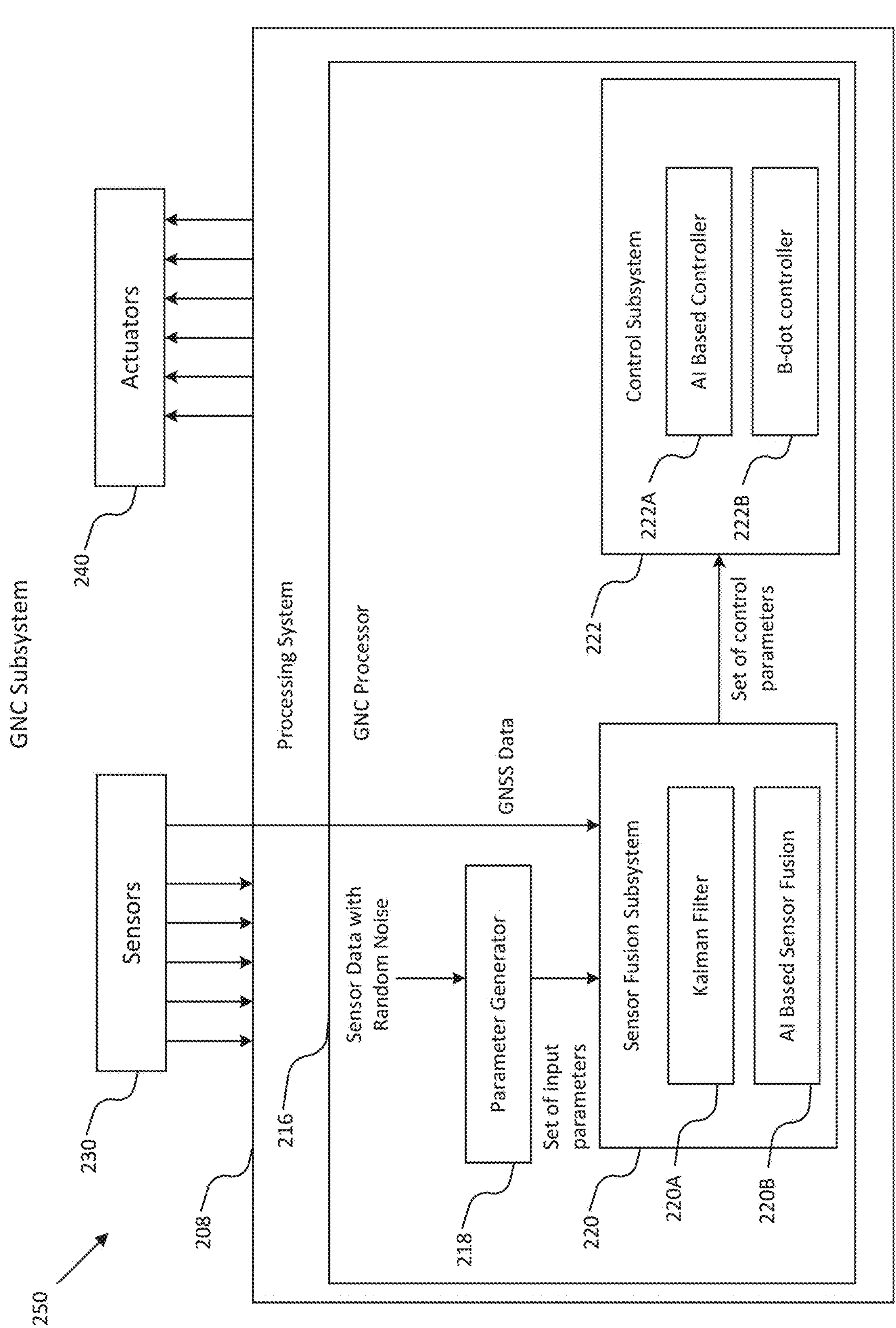
FIG. 2D is a block diagram illustrating one non-limiting example of a guidance, navigation, and control (GNC) subsystem of a satellite in which aspects of the technology may be practiced.

FIG. 2D is a block diagram illustrating one non-limiting example of a guidance, navigation, and control (GNC) subsystem 250 of a satellite 120 in which aspects of the technology may be practiced. The GNC subsystem 250 coordinates the satellite's precise and efficient operation in space and performs several functions to achieve guidance, navigation, and control of the satellite 120. The guidance function of the GNC subsystem 250 is responsible for charting the satellite's intended path, orientation, and position. The GNC subsystem 250 may determine the optimal trajectory and plan essential maneuvers, enabling tasks such as orbit insertion, station-keeping, and payload observation. The navigation function of the GNC subsystem 250 focuses on real-time positioning and velocity determination. Accurate navigation ensures that the satellite adheres to its planned course and can swiftly adapt to any deviations. The control function of the GNC subsystem 250 involves maintaining the satellite's orientation, orbit, and velocity. The control function of the GNC subsystem 250 assures that the satellite 120 remains on its intended path, even in the presence of external forces like solar radiation pressure and gravitational perturbations. Further, safety and redundancy mechanisms are integrated into the GNC subsystem 250 to uphold the reliability of satellite missions. The GNC subsystem 250 may be designed to detect anomalies, system malfunctions, or collision risks and initiate rapid corrective actions, including the activation of backup systems or the execution of collision avoidance maneuvers, safeguarding the satellite's integrity and mission success.

As shown in FIG. 2D, the GNC system 250 may include a guidance, navigation, and control (GNC) processor 216 that may be implemented, in one embodiment, within the processing system 208 of flight computer 202, various sensors 230 and various actuators 240. Before describing the GNC processor 216 in accordance with the disclosed embodiments, non-limiting examples of the sensors 230 and non-limiting examples of actuators 240 will be described.

Sensors

The GNC subsystem 250 may include any number of sensors 230 in any combination. Examples of sensors 230 can include, but are not limited to: magnetometers, gyroscopes, accelerometers, star trackers, sun sensors, Earth sensors, Global Positioning System (GPS) receivers, Global Navigation Satellite System (GNSS) receivers, etc. The sensors may be used to precisely establish the satellite's location and movement.

Magnetometers can measure the magnetic field experienced or observed by the satellite. Magnetometers can be used to determine the roll and pitch angles. Magnetometers are used to measure changes in the Earth's magnetic field. By tracking these changes, satellites can determine their orientation with respect to the Earth's magnetic field. Gyroscopes are one of the primary sensors often used to measure angular rates in satellites. They operate based on the principle of angular momentum conservation. There are different types of gyroscopes, including mechanical gyroscopes and more modern, non-mechanical alternatives like ring laser gyroscopes (RLG) and fiber-optic gyroscopes (FOG). These sensors can provide highly accurate and reliable measurements of angular rates about each axis of the satellite. Accelerometers are sensors designed to measure linear acceleration along one or more axes. It should also be noted that in some embodiments, Inertial Measurement Units (IMUs) combine accelerometers and gyroscopes to provide a complete picture of a satellite's motion and orientation. These units measure linear accelerations and angular rates, making them useful for determining the satellite's orientation about its various axes.

In addition, star trackers are highly accurate optical sensors that capture images of stars and compare them to known star charts to precisely determine the satellite's orientation. They are often used to determine all three axes of rotation (roll, pitch, and yaw) and can provide extremely accurate angular rate measurements.

A sun sensor is an optical device that detects and measures the direction of the Sun. By measuring the Sun's position relative to the satellite, it is possible to determine the satellite's attitude in reference to the Sun. This is useful for maintaining proper solar panel orientation and can help determine roll, pitch, and yaw rates.

An Earth sensor, also known as an Earth horizon sensor or Earth-looking sensor, measures the satellite's orientation and determines its attitude or position with respect to the Earth's surface. Earth sensors are particularly important for Earth observation satellites, scientific spacecraft, and communication satellites that need precise knowledge of their orientation in orbit. An Earth sensor typically consists of a specialized optical instrument or sensor system that is designed to detect the Earth's limb or the boundary between the Earth's surface and the dark space of outer space. There are two main types of Earth sensors commonly referred to as nadir and limb sensors. Nadir sensors look directly downward (toward the nadir), and their primary function is to measure the satellite's roll and pitch angles by observing the Earth's limb. They provide information on how the satellite is oriented relative to the Earth's surface. Limb sensors are designed to detect the Earth's limb at an angle, typically at a few degrees above the horizon. They provide data on roll, pitch, and yaw angles, allowing for a more complete determination of the satellite's attitude. Earth sensors provide information about the satellite's attitude or orientation in three dimensions. This includes roll (rotation around the satellite's forward axis), pitch (rotation around the lateral axis), and yaw (rotation around the vertical axis). These angles are vital for precise satellite control and ensuring that instruments or communication antennas are accurately pointed at their target on the Earth's surface. By continuously monitoring the Earth's limb or horizon, Earth sensors contribute to the determination of the satellite's position and velocity, which are crucial for orbit maintenance and control.

In some cases, especially for LEO satellites, GPS receivers can be used to determine the satellite's attitude. By analyzing the Doppler shift of signals from multiple GPS satellites, the satellite can determine its attitude with high accuracy.

Actuators

Attitude control of a satellite is important for stabilizing it and making course corrections. There are various types of actuators used to change the orientation and/or position of the satellite in space. The GNC subsystem 250 may include any number of actuators 240 mechanisms to stabilize the satellite and enact course corrections. Examples of actuators 240 can include any combination of thrusters, reaction wheels, magnetic torquers, deployable structures and other mechanisms to stabilize the satellite and enact course corrections.

Thrusters are small rocket engines that expel mass to generate thrust. They can be used for both attitude control and orbit adjustments. By firing thrusters in different directions, a satellite can change its orientation or perform larger course corrections. Thrusters can be categorized into different types, such as chemical thrusters, electric propulsion systems (ion thrusters, Hall-effect thrusters), and cold gas thrusters.

Reaction wheels are one of the most common attitude control actuators that can control a satellite's orientation. They consist of a spinning wheel or a flywheel that can be controlled by changing its rotation speed. When the wheel spins in one direction, the satellite will rotate in the opposite direction, following the law of conservation of angular momentum. By precisely controlling the speed of these wheels, satellites can make precise attitude adjustments. In addition, they can also be used to indirectly measure angular rates. By monitoring the angular momentum changes induced by the reaction wheels, the satellite's control system can infer its rotation rates about each axis.

Control Moment Gyroscopes (CMGs) are similar to reaction wheels but can provide higher torque. They consist of a spinning rotor within a gimbal system. By changing the orientation of the rotor, angular momentum can be controlled, allowing for precise attitude adjustments. CMGs are often used in satellites with higher mass and moment of inertia.

Magnetic torquers use the Earth's magnetic field to generate torque. They consist of coils of wire and a magnetic dipole. By passing a current through the coils, a magnetic moment is created, which interacts with the Earth's magnetic field and produces torque. This allows satellites to align themselves with the Earth's magnetic field or make controlled rotations. They are often used in conjunction with reaction wheels or other actuators to achieve fine control.

Deployable structures on satellites, such as wings or solar arrays, serve several important functions and can significantly enhance the satellite's performance and capabilities. For example, deployable structures on satellites serve various functions including power generation, thermal control, communication, stabilization, instrument deployment, drag control, launch configuration, and mission extension. Some satellites, use deployable structures for stabilization and attitude control. These structures can help maintain the satellite's orientation and reduce unwanted rotations. Some satellites use deployable structures to change their aerodynamic characteristics, control drag, or interact with the Earth's atmosphere.

GNC Processor

Referring again to FIG. 2D, the GNC processor 216 may include a parameter generator 218, a sensor fusion subsystem 220, and a control subsystem 222. Additionally, in some embodiments, a sensor integration system (not illustrated) may be an optional component of the GNC processor 216 that allows it to receive data from sensors 230.

The parameter generator 218 may be configured to receive sensor data with controlled random noise and generate a set of input parameters associated with the satellite 120. In one non-limiting embodiment, the controlled random noise is added with the sensor data for exploration to account for a difference in actual values of the set of input parameters and values of the set of input parameters sensed by the various sensors. Adding controlled random noise can help increase system robustness by allowing the machine to be controlled in a way that allows for some neurons to avoid reliance on each other. The set of input parameters may include at least one of magnetic field (e.g., as measured by one or more magnetometers of the satellite 120) and angular velocities of the satellite 120 (e.g., as measured by one or more gyroscopes, IMUs, etc.). In some embodiments, the set of input parameters may also include any combination of angular rates 120, Euler angles, and quaternions (e.g., as measured by one or more gyroscopes, IMUs, etc.); the position of the satellite (e.g., position derived from the magnetic field vector), pitch, roll, yaw, direction, attitude-quaternion vector, and principal axes (e.g., as measured by star trackers); and sun and earth angles (e.g., as measured by sun sensor, Earth sensor, etc.).

Referring again to FIG. 2D, the parameter generator 218 may select any combination of the input parameters associated with the satellite 120 as the set of input parameters and provide the set of input parameters to the sensor fusion subsystem 220. For example, in one non-limiting implementation, the sensor fusion subsystem 220 may receive a set of input parameters, such as the magnetic field and the angular velocities. In addition, the sensor fusion subsystem 220 may also receive GNSS data from a GNSS receiver which provides information related to at least a position and a velocity of the satellite 120. In some implementations, using sensor fusion obtained from multiple sensors, such as the combination of magnetic field, angular velocities and/or GNSS data, is particularly useful as it may provide more accurate status for the state of the system and thus provide more accurate results.

The sensor fusion subsystem 220 may combine or "fuse" the data from any combination of different sensors 230. Each sensor serves a specific purpose, such as measuring orientation, velocity, position, celestial observations, magnetic field data, etc. By fusing data from different sensors, the sensor fusion subsystem 220 may provide fused sensor data that allows for improved guidance, navigation, and control accuracy that is important for satellite missions. This is especially true in scenarios where precise orbital maneuvers, station-keeping, and/or rendezvous with other satellites or space objects are required. As an example, sensor fusion subsystem 220 may assist in maintaining the satellite's attitude or orientation using data obtained from gyroscopes and star trackers, for example, that provide data that helps control the satellite's orientation in space.

In an aspect of the present disclosure, the sensor fusion subsystem 220 implements a Kalman filter 220A and an artificial intelligence (AI) based sensor fusion module 220B to integrate the sensor data with the GNSS data. The Kalman filter 220A may perform a recursive two-stage process that includes a prediction stage and an update (or correction) stage. The prediction stage may make estimations of the current state and uncertainties by projecting forward the prior state and uncertainties to obtain an a priori estimation of the current state and uncertainties, and the update stage may make an update to the a priori estimation based on the current measurement to obtain an improved a posteriori estimation. In some cases, the AI based sensor fusion module 220B is also implemented. AI based sensor fusion module 220B includes a sensor fusion block (e.g., a circuit, or a processing device executing an image processing algorithm) that detects objects (e.g., a nearby satellite or object) expected to be on the image. The sensor fusion algorithm(s) can be implemented on a dedicated processing device (e.g., SOC, FPGA, CPU, GPU, etc.).

In some aspects of the present disclosure, the AI based sensor fusion module 220B implements a neural network algorithm such as a Long Short-Term Memory (LSTM) network for integrating the sensor data with the GNSS data. Satellites, each with multiple sensors, may face the challenge of combining data presented in sequential patterns. The LSTM network may include a network of LSTM cells that can process, during a current time step (T), the sensor data and the GNSS data at the current time step (T) and one or more previous LSTM outputs at one or more corresponding previous time steps to generate integrated data at the current time step (T). For instance, in one non-limiting embodiment, the number of one or more previous LSTM outputs is specified by a window size (w) that defines the number of the one or more previous LSTM outputs to be processed by the LSTM network along with the sensor data and the GNSS data to generate the integrated data at the current time step (T).

Based on the integration of the sensor data and the GNSS data, a set of control parameters, i.e., integrated data, is generated by the sensor fusion subsystem 220 and provided to the control subsystem 222. The set of parameters may include at least one of a set of angular rates and a set of Euler angles. In some implementations, the set of parameters may include additional information, such as, data from a sun sensor, a set of quaternions, and a position of the satellite, etc.

Based on the set of control parameters, the control subsystem 222 may generate control signals to control the orientation of the satellite 120 to stabilize the satellite 120. In an aspect of the present disclosure, the control subsystem 222 may be implemented by at least one of an AI based controller 222A and a B-dot controller 222B.

The AI based controller 222A may integrate and implement machine learning algorithms to govern and stabilize satellites 120. The AI based controller 222A may harness the power of artificial intelligence and machine learning to deliver intelligent, autonomous, and adaptive control for satellites 120, thus enhancing their operational efficiency and overall mission success. AI based controller 222A may include a comprehensive suite of machine learning algorithms, including neural networks, deep learning models, and reinforcement learning models. In an embodiment, the AI based controller 222A implements a reinforcement learning algorithm. These algorithms play can analyze sensor data, historical mission data, and real-time telemetry, enabling the satellite 120 to continually adapt to its environment and make dynamic adjustments.

Additionally, the AI based controller 222A is capable of autonomously making decisions. By utilizing machine learning algorithms, such as the reinforcement learning algorithm, the AI based controller 222A allows the processing system 208 of the satellite 120 to handle tasks such as attitude control, thruster firings, and trajectory adjustments independently and intelligently. This level of autonomy helps to ensure that the satellite 120 can adapt to changing mission objectives, conditions, and unforeseen challenges in real-time. Thus, the AI based controller 222A may stabilize the satellite 120, ensuring that the satellite 120 maintains the desired orientation and position in space.

In some embodiments, the B-dot controller 222B may be implemented along with the AI based controller 222A. Along with the AI based controller 222A, the B-dot controller 222B operates on the principle of utilizing the Earth's magnetic field to control the satellite's orientation. As the Earth's magnetic field is relatively uniform in low Earth orbit, the B-dot controller 222B utilizes the magnetic field as a stable reference for attitude control. Initially, both the AI based controller 222A and the B-dot controller 222B control the orientation of the satellite 120 based on the set of parameters. In one embodiment, when a satellite 120 is deployed into space, the satellite 120 often tumbles or rotates in an uncontrolled manner. The B-dot controller 222B may be employed to stabilize the satellite's orientation and reduce its tumbling to a manageable level. Thereafter, as will be explained in greater detail below, the AI based controller 222A controls the orientation of the satellite by bringing the set of parameters, such as the angular velocities and the Euler angles, within the desired thresholds to stabilize the satellite 120.

Figure 3:
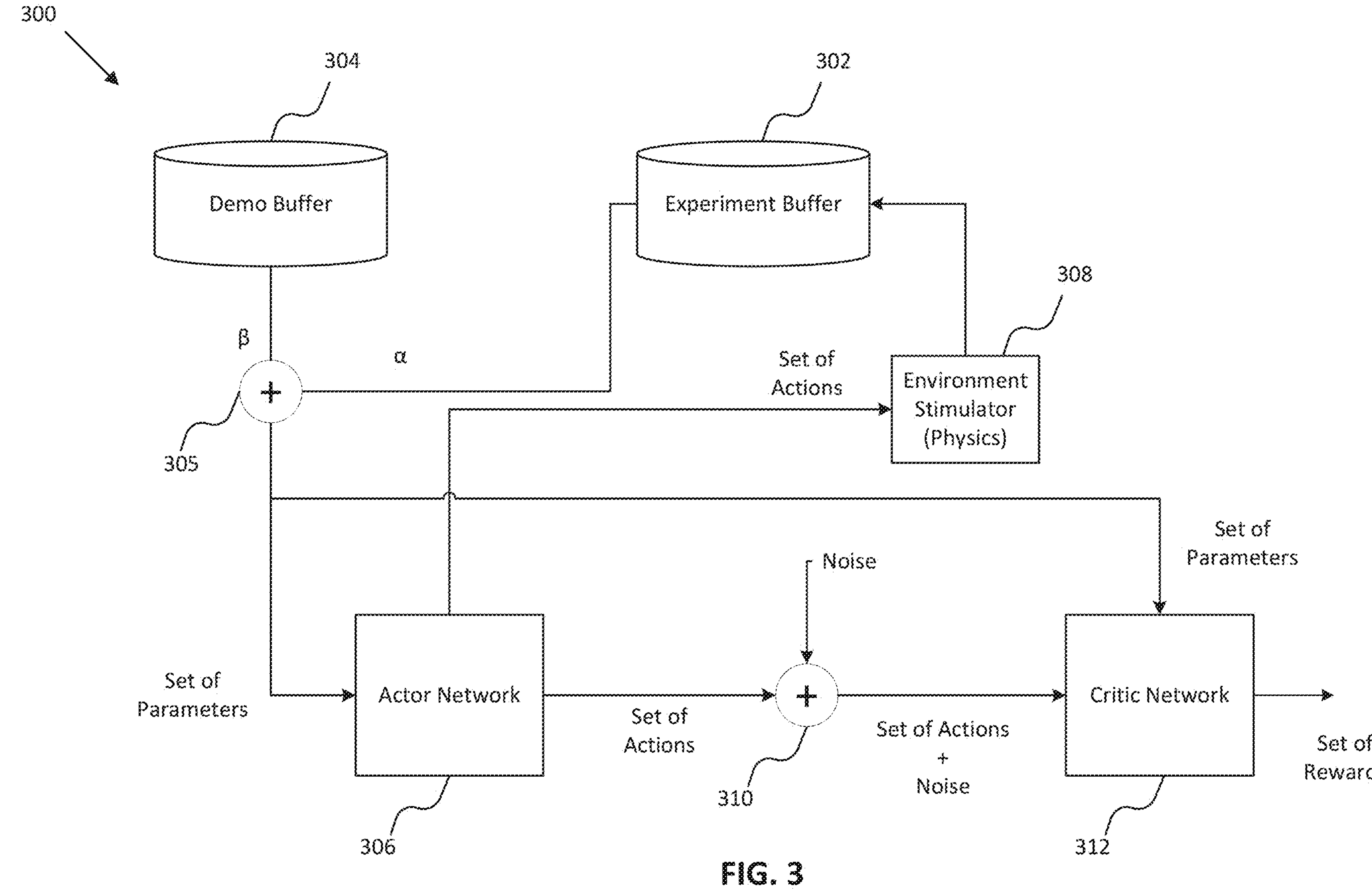
FIG. 3 is a block diagram illustrating one non-limiting example of an omega agent to control and stabilize a satellite according to aspects of the disclosed technology.

FIG. 3 is a block diagram illustrating one non-limiting example of an omega agent 300 that may be used to control and stabilize a satellite according to aspects of the disclosed technology. The omega agent 300 may be based on an actor-critic network 306, 312 and focuses on bringing angular velocities in all dimensions below a specified threshold (e.g., 0.01 rad/s). The omega agent 300 includes an experiment buffer 302, a demonstration buffer 304, a mixer 305, an actor network 306, an environment simulator 308, a mixer 310, and a critic network 312. In one embodiment, the omega agent 300 may be implemented by the flight computer 202, and the experiment buffer 302 and the demonstration buffer 304 may be implemented by the one or more buffers 214 of the memory 210 of the flight computer 202 demonstration buffer. The experiment buffer 302 stores previous experimental values and the demonstration buffer 304 stores reference values for guiding the satellite 120 to navigate correctly and operate in a controlled manner. The experimental values stored in the experiment buffer 302 represent the values of the set of input parameters based on the previous iterations of training or execution of the reinforcement learning model to control the orientation of the satellite. In one embodiment, the experimental values may be live values for the satellite angular rates, Euler angles, and also the magnetic field as the satellite propagates in space. By contrast, the reference values stored in the demonstration buffer 304 represent demonstration data, the generation of which is explained in detail later in FIG. 7.

The values stored in the experiment buffer 302 and the demonstration buffer 304 are sampled based on first and second weight values. In an embodiment, the values stored in the experiment buffer 302 are multiplied by the first weight value, e.g., a, and the values stored in the demonstration buffer 304 are multiplied by the second weight value, e.g., $\beta$, to generate the set of parameters associated with an orientation of the satellite 120. In one embodiment, the values stored in the experiment buffer 302 multiplied by the first weight value, e.g., $\alpha$, and the values stored in the demonstration buffer 304 multiplied by the second weight value, e.g., $\beta$, are provided as an input to the mixer 305 which outputs the set of parameters that are generated based on the two inputs. Initially, the first weight value ($\alpha$) may be selected to be less than the second weight value ($\beta$) to initiate the control of the satellite 120 such that the experimental values stored in the experiment buffer 302 are sampled less than the reference values stored in the demonstration buffer 304. Once a significant amount of data is collected (e.g., 10,000 timesteps or more) in the experiment buffer 302 that may help navigating such that the orientation of the satellite 120 is controlled and the satellite 120 can be stabilized, the first weight value ($\alpha$) is selected to be greater than the second weight value ($\beta$) such that the experimental values stored in the experiment buffer 302 are sampled more than the reference values stored in the demonstration buffer 304.

In one aspect of the present disclosure, the set of parameters associated with an orientation of the satellite 120 may include, for example, any combination of angular rates, Euler angles, quaternions, the position of the satellite (e.g., position derived from the magnetic field vector), pitch, roll, yaw, direction, attitude-quaternion vector, principal axes, and sun and earth angles. In one exemplary non-limiting embodiment, the set of parameters includes a set of angular rates and a set of Euler angles.

Angular rates represent the rates at which the satellite 120 is rotating around each of its axes and are typically measured in degrees per second or radians per second. Accurate angular rate measurements are important for satellite control algorithms including those used for satellite orientation control and attitude determination. Roll represents the rotation of the satellite 120 around its longitudinal axis and may be measured in degrees indicating the rotation of the satellite 120 in the plane perpendicular to the orbit. Pitch represents the rotation of the satellite 120 around its transverse axis and may be measured in degrees indicating the rotation of the satellite 120 along the direction of its velocity vector. Yaw represents the rotation of the satellite around its normal axis and may be measured in degrees indicating the rotation of the satellite 120 in the vertical plane perpendicular to the orbit. Euler angles are alternate representation for describing the orientation of a satellite. They consist of three angles (roll, pitch, yaw) and define a sequence of rotations that bring a reference frame to the satellite's frame.

Quaternions provide a concise and computationally efficient way to represent rotations in three-dimensional space. A quaternion is a mathematical representation commonly used to describe the orientation of a satellite consisting of four values (w, x, y, z), where w represents the scalar part and (x, y, z) represent the vector part. Attitude Quaternion-Vector (or Attitude Quaternion-Vector-Error) is a parameterization commonly used in attitude control systems. It combines a quaternion (as described earlier) with an angular velocity vector or an error vector, allowing for efficient control and estimation of the satellite's orientation.

Sun and Earth Angles provide information about the angle between the satellite's reference frame and the direction to the Sun or Earth and may be used for attitude determination algorithms that utilize measurements from sun sensors or Earth sensors.

The magnetic field vector represents the strength and direction of the Earth's magnetic field in the satellite's frame and may be used for attitude determination, especially in combination with magnetometers.

Some or all of the aforementioned parameters can be used collectively define the orientation of a satellite 120 in space. They play a role in the GNC subsystem 250, where accurate knowledge of the satellite's attitude is essential for tasks such as attitude determination, attitude control, and pointing payloads towards specific targets. The choice of parameterization depends on various factors, including the specific mission requirements, control algorithms, computational efficiency, and potential limitations associated with each representation.

Referring again to FIG. 3, the actor network 306 receives the set of parameters associated with the orientation of the satellite 120. During the implementation phase (also referred to as a training or learning phase), the actor network 306 implements, based on each of the set of parameters, a reinforcement learning model to control the angular velocities of the satellite 120 to bring the angular velocities of the satellite 120 within the desired thresholds. Implementing a reinforcement learning model may be beneficial, for example, due to its capability to gather data from many satellites and use them to enhance the performance of the system as a whole, while other techniques cannot provide such capabilities.

In one non-limiting embodiment, the reinforcement learning model may be based on an actor critic model, such as an actor-critic deep deterministic policy gradient model. Use of actor-critic deep deterministic policy gradient model can be beneficial in satellite control because it works with continuous data to control the output of continuous actuations, and also provides a robust mechanism to use classic control data (stored in the demonstration buffer) as the first guesses, reducing the dimensions of optimization. Alternatively, the reinforcement learning model may be based on models, such as, Proximal Policy Optimization (PPO), Twin Delayed DDPG (TD3), Trust Region Policy Optimization (TRPO), Soft Actor-Critic (SAC), Advantage Actor-Critic (A2C), Deep Q-Network (DQN), Asynchronous Advantage Actor-Critic (A3C), Trust Region Policy Optimization with Proximal Policy Optimization (TRPO-PPO), Deterministic Policy Gradient (DPG), Continuous Actor-Critic Learning Automaton (CACLA), Generalized Advantage Estimation (GAE), Normalized Advantage Functions (NAF), Deep Deterministic Policy Gradients from Demonstrations (DDPGfD), Policy Gradient with Parameter-Based Exploration (PGPE), Natural Actor-Critic (NAC), Maximum a Posteriori Policy Optimization (MPO), Stochastic Value Gradient (SVG), Deep Episodic Value Iteration (DEVI), Distributed Distributional Deterministic Policy Gradients (D4PG), REINFORCE with Baseline models.

The aforementioned algorithms represent a mix of policy-based, value-based, and hybrid approaches, each with their own strengths and areas of application. It will be apparent to a person skilled in the art that any model or algorithm may be selected for the implementation of the reinforcement learning model based on the suitability of an algorithm for the specific problem and the trade-offs between exploration, exploitation, sample efficiency, and stability required for a given task.

To implement the reinforcement learning model, the actor network 306 may predict, based on each of the set of parameters, a set of actions to be implemented by the satellite 120 to control the angular velocities of the satellite 120. Based on the set of parameters, the actor network 306 may determine a current state of the satellite and the current information regarding the angular velocities of the satellite. Further, the actor network 306 may compare the current angular velocities of the satellite and desired angular velocities to generate a set of possible actions based on the current state of the satellite to stabilize the satellite. For example, if the difference between the current and desired angular velocities is high, then the set of actions may indicate that the actuators such as the thrusters may have to be activated for larger time duration, and if the difference between the current and desired angular velocities is low, then the set of actions may indicate that the actuators such as the thrusters may have to be activated for relatively smaller time duration. The environment simulator 308 is a simulation engine that may simulate the set of actions on the satellite 120 considering the physics of the real world and apply the set of actions on the satellite 120 to determine the effects of the set of actions. The result of simulation is stored in the experiment buffer 302. The mixer 310 may receive the set of actions from the actor network 306 and noise and may add the noise to the set of actions to provide the set of actions with the added noise to the critic network 312. Noise may be added to actions during the training stage to encourage exploration when training the reinforcement learning model. As will be explained below, once reinforcement learning agent has been successfully trained, noise can be removed in the live environment when reinforcement learning agent is predicting next actions.

In some embodiments, the noise may be introduced to assess the stability and performance of reinforcement learning models (such as the actor critic reinforcement learning model) under varying conditions. In one non-limiting embodiment, the noise is added to the set of actions for exploration purpose to account for the differences in the actions executed in real-world scenario and the asset of actions executed in the simulation environment. Noise may be deliberately added as part of the experimental design to test the robustness of the system or to explore a response of the system to different conditions, which may help identify unexpected outcomes, assess the system's sensitivity, and gain a better understanding of the behavior of the system in real-world scenarios. Stated differently, noise may be added to enhance robustness by letting the network explore more directions, in which it is looking for optimal solutions.

The critic network 312 receives the set of parameters and the set of actions with the added noise and may predict an outcome of the implementation of the set of actions to generate a set of rewards. The set of rewards are generated such that larger rewards are generated when the angular velocities come closer to the expected angular velocities. In one example, the expected angular velocities are 0 rad/s in each direction. For example, when the implementations of the set of actions result in angular velocities being close to 0 rad/s the rewards are high indicating that the set of actions positively effected to stabilize the satellite, and when the implementations of the set of actions result in angular velocities being further away from 0 rad/s the rewards are low indicating that the set of actions negatively effected to stabilize the satellite. A non-limiting exemplary embodiment of the implementation phase of the omega agent 300, or training of the omega agent 300, will be described below with reference to FIG. 8.

Once the omega agent 300 is trained, during the execution phase (also referred to herein as the deployment phase), the actor network 306 executes, based on each of the set of parameters, a reinforcement learning model to control the angular velocities of the satellite 120 to reduce or eliminate the tumbling effect of the satellite 120. To execute the reinforcement learning model, the actor network 306 may predict, based on each of the set of parameters, a set of actions to be executed by the satellite 120 to control the angular velocities of the satellite 120. The set of actions provided to the environment simulator 308. Based on the set of actions, a set of control signals are generated to control the actuators 240 such that the actuators 240 are executing the set of actions to reduce or eliminate the tumbling effect of the satellite by reducing the angular velocities within the desired threshold. The result of execution of the set of actions by the actuators 240 is stored in the experiment buffer 302. The mixer 310 may receive the set of actions from the actor network 306 and noise, and may add the noise to the set of actions to provide the set of actions with the added noise to the critic network 312. The critic network 312 receives the set of parameters and the set of actions with the added noise and may predict an outcome of the execution of the set of actions to generate a set of rewards. The set of rewards are generated such that larger rewards are generated when the angular velocities come closer to the expected angular velocities. Once the angular velocities of the satellite 120 are within the expected velocities, the system shifts to the Euler agent 400, which will now be described with reference to FIG. 4.

Figure 4:
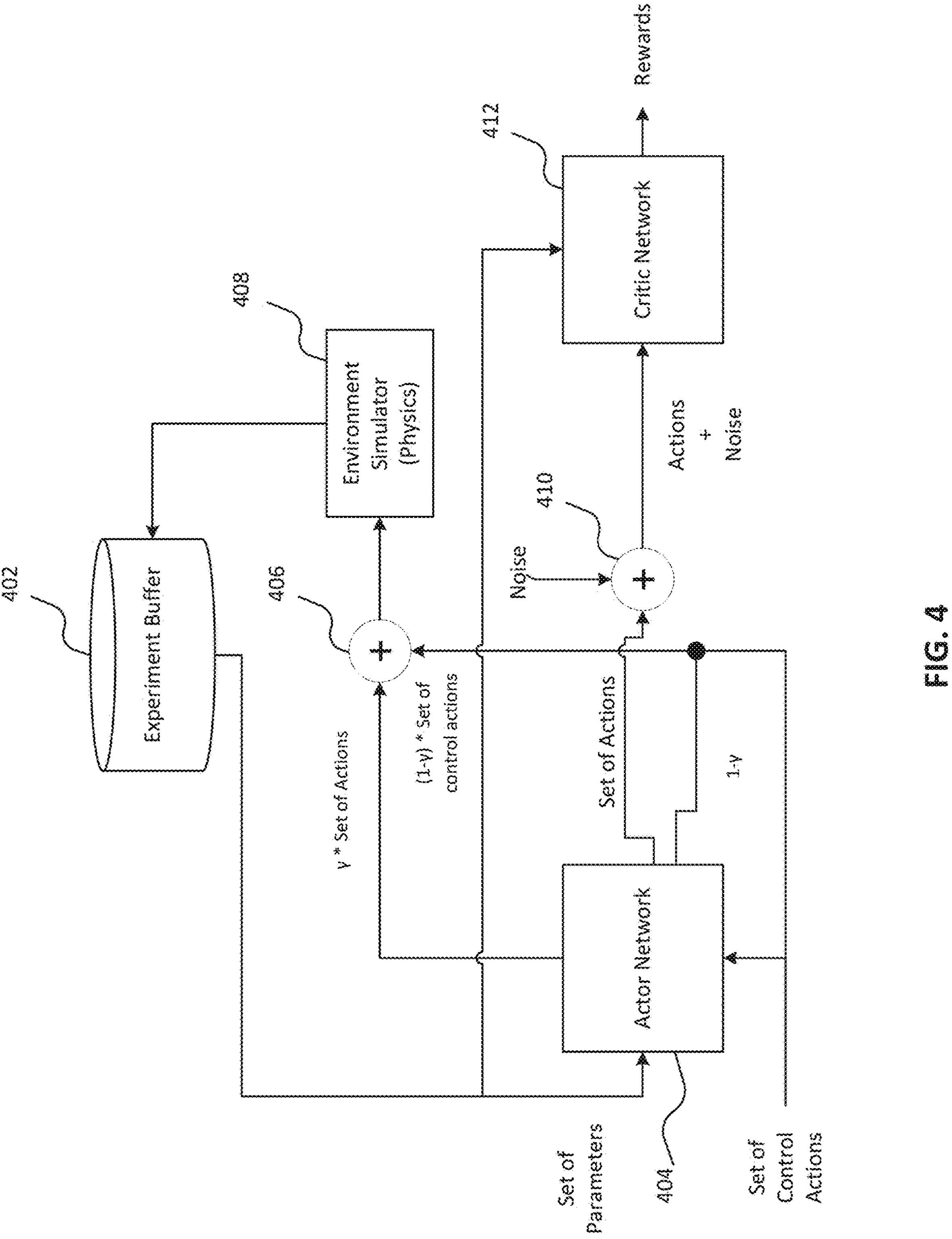
FIG. 4 is a block diagram illustrating one non-limiting example of an Euler agent to control and stabilize a satellite according to aspects of the disclosed technology.

FIG. 4 is a block diagram illustrating one non-limiting example of a Euler agent 400 to control and stabilize a satellite according to aspects of the disclosed technology. The Euler agent 400 may be based on an actor-critic network and focuses on bringing Euler angles in all dimensions below a threshold (e.g., 1.14 degrees). The Euler agent 400 includes an experiment buffer 402, an actor network 404, a first mixer 406, an environment simulator 408, a second mixer 410, and a critic network 412. In one embodiment, the Euler agent 400 may be implemented by the flight computer 202 and the one or more buffers 214 of the memory 210 of the flight computer 202 (to implement the experiment buffer 402 of the Euler agent 400). The experiment buffer 402 stores previous experimental values for guiding the satellite 120 to navigate correctly and operate in a controlled manner.

As its inputs, the actor network 404 receives the set of parameters that are associated with and/or describe the orientation of the satellite 120 and a set of control actions. As noted above, the set of parameters may include any combination of angular rates, quaternions, the position of the satellite (e.g., position derived from the magnetic field vector), pitch, roll, yaw, Euler angles, direction, attitude-quaternion vector, principal axes, and sun and earth angles. During the implementation phase (also referred to as a training or learning phase), the actor network 404 implements, based on each of the set of parameters and the set of control actions, a reinforcement learning model to control the orientation of the satellite 120 to stabilize the satellite 120.

In one non-limiting embodiment that is illustrated in FIG. 4, the reinforcement learning model may be based on an actor-critic model, such as an actor-critic deep deterministic policy gradient model. Alternatively, the reinforcement learning model may be based on any of Proximal Policy Optimization (PPO), Twin Delayed DDPG (TD3), Trust Region Policy Optimization (TRPO), Soft Actor-Critic (SAC), Advantage Actor-Critic (A2C), Deep Q-Network (DQN), Asynchronous Advantage Actor-Critic (A3C), Trust Region Policy Optimization with Proximal Policy Optimization (TRPO-PPO), Deterministic Policy Gradient (DPG), Continuous Actor-Critic Learning Automaton (CACLA), Generalized Advantage Estimation (GAE), Normalized Advantage Functions (NAF), Deep Deterministic Policy Gradients from Demonstrations (DDPGfD), Policy Gradient with Parameter-Based Exploration (PGPE), Natural Actor-Critic (NAC), Maximum a Posteriori Policy Optimization (MPO), Stochastic Value Gradient (SVG), Deep Episodic Value Iteration (DEVI), Distributed Distributional Deterministic Policy Gradients (D4PG), REINFORCE with Baseline models.

To implement the reinforcement learning model, the actor network 404 may predict, based on each of the set of parameters, a set of actions and a weight value, e.g., γ, to be implemented by the satellite 120 to control the orientation of the satellite 120. For example, in one embodiment, the actor network 404 takes each set of parameters as inputs into its neural networks. Every node in the neural networks has a learnable weight. It then performs two types of computations, called a forward pass and a backpropagation. The forward pass may produce a probability distribution of possible actions, then select the highest probability actions as outputs. The backpropagation may calculate gradients for updating the actor network's learnable weights. The gradients are calculated based on the difference between the expected return and the actual return.

The first mixer 406 may sample the set of actions and the set of control actions based on the weight value. In one embodiment, sampling the set of actions and the set of control actions based on the weight value includes multiplying the set of actions with the weight value, e.g., γ, to generate resultant values, multiplying the set of control actions by another value (1-γ) to generate other resultant values, and adding both the resultant values by the first mixer 406 and providing to the environment simulator 408.

The environment simulator 408 is a simulation engine that may simulate the set of actions and the set of control actions on the satellite 120 considering the physics of the real world and applying the set of actions on the satellite 120 to determine the effects of the set of actions. The result of simulation is stored in the experiment buffer 402. The second mixer 410 may receive the set of actions from the actor network 404 and noise and may add the noise to the set of actions to generate an output that includes the set of actions with the added noise. The critic network 412 receives the set of parameters and the set of actions with the added noise and may predict an outcome of the implementation of the set of actions to generate a set of rewards. In one embodiment, similar to actor network 404, the critic network 412 also performs two types of computations, called a forward pass and a backpropagation. In the forward pass, the critic network 412 also takes set of parameters and actions taken as inputs, and outputs a value as expected return. In the backpropagation process, the gradients for updating the learnable weights are calculated using a Temporal Difference method, where it is calculating the difference between the predicted value of the current state and the reward received plus the value of the next state. The set of rewards may be generated such that larger rewards are generated when the Euler angles come closer to the expected Euler angles. In one non-limiting example, the expected Euler angles may be 0 degrees in each direction. A non-limiting exemplary embodiment of the implementation phase of the Euler agent 400, or training of the Euler agent 400, will be described below with reference to FIG. 9.

Once the Euler agent is trained, during the execution phase (also referred to herein as the deployment phase), the actor network 404 executes, based on each of the set of parameters and the control actions, a reinforcement learning model to control the orientation or attitude of the satellite 120 to stabilize the satellite 120. To execute the reinforcement learning model, the actor network 404 may predict, based on each of the set of parameters, a set of actions and a weight value, e.g., γ, to be executed by the satellite 120 to control the orientation of the satellite 120. The first mixer 406 may sample the set of actions and the set of control actions based on the weight value. In one embodiment, the set of actions are multiplied with the weight value, e.g., γ, and the set of control actions are multiplied by (1−γ), both the resultant values may be added by the first mixer 406 and provided to the environment simulator 408.

Based on the set of actions, a set of control signals are generated to control the actuators 240 such that the actuators 240 are executing the set of actions to control the attitude of the satellite by reducing the Euler angles within the desired threshold. The result of execution of the set of actions by the actuators 240 is stored in the experiment buffer 402. The second mixer 410 may receive the set of actions from the actor network 404 and noise and may add the noise to the set of actions to provide the set of actions with the added noise to the critic network 412. The critic network 412 receives the set of parameters and the set of actions with the added noise and may predict an outcome of the execution of the set of actions to generate a set of rewards. The set of rewards are generated such that larger rewards are generated when the Euler angles come closer to the expected Euler angles. It may be understood by a person skilled in the art that the system may shift between the Omega agent 300 and the Euler agent 400 multiple times until the satellite is stabilized and the angular velocities and the Euler angles are within the desired ranges, without deviating from the scope of the present disclosure.

Figure 5:
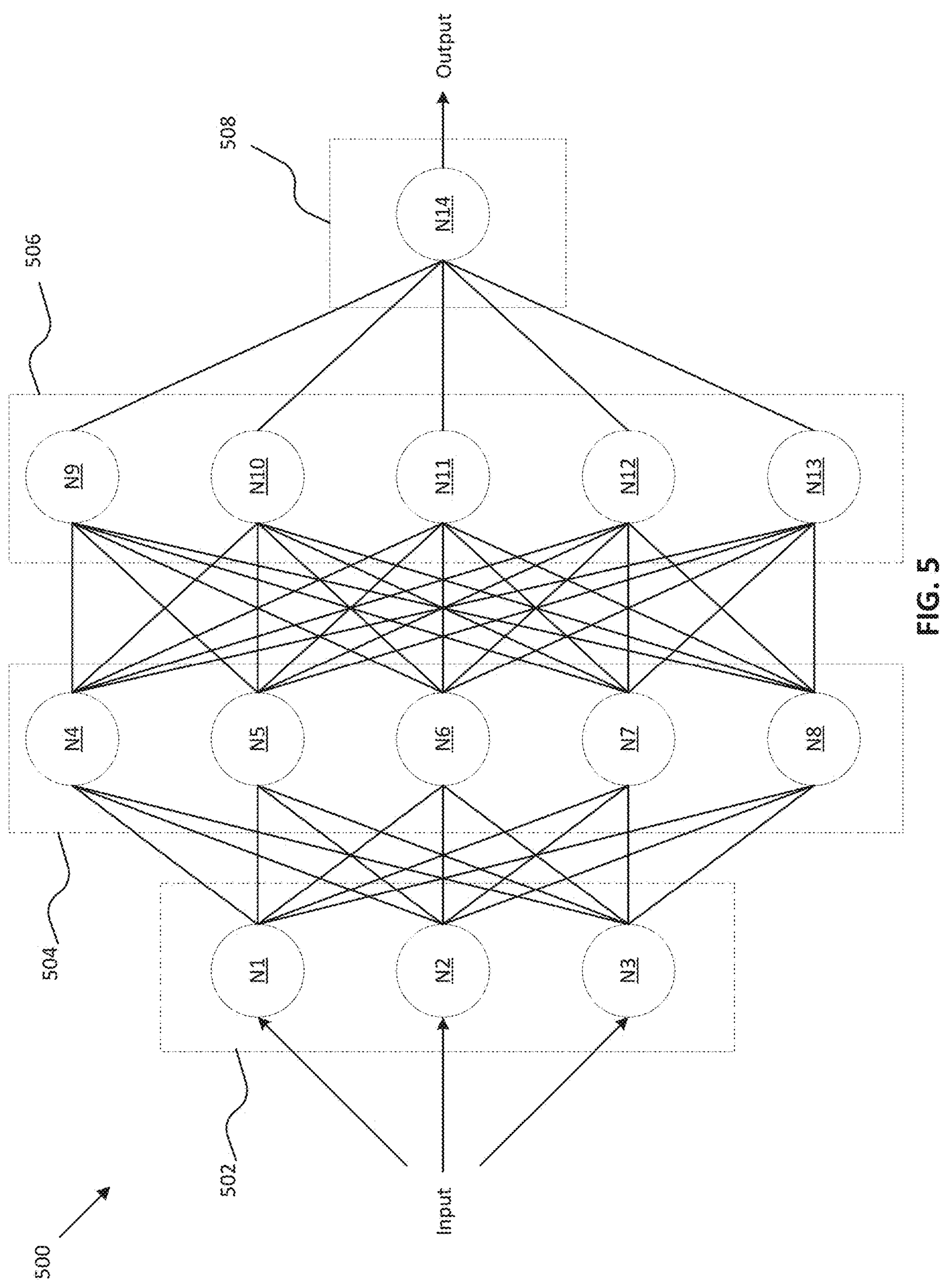
FIG. 5 is a block diagram illustrating one non-limiting example of a neural network according to aspects of the disclosed technology.

FIG. 5 is a block diagram illustrating one non-limiting example of a neural network 500 according to aspects of the disclosed technology. The neural network 500 may be capable of capturing complex patterns and relationships in the input data. It will be apparent to a person skilled in the art that the exact configuration and the number of nodes in each layer can be adjusted based on the specific problem being solved. The neural network architecture is flexible and can be used for various machine learning tasks with appropriate adjustments to the number of nodes and training parameters. As illustrated in FIG. 5, the neural network 500 includes four layers: one input layer 502, two hidden layers 504 and 506, and one output layer 508. The input layer 502 includes three nodes N1-N3. The input layer 502 may be responsible for receiving the input data, such as the angular velocities and the Euler angles. The nodes N1-N3 transmit the input data to the hidden layer 504. The first hidden layer 504 has five nodes N4-N8 and the second hidden layer 506 has five nodes N9-N13. The first and second hidden layers 504 and 506 may perform the main computation of the neural network 500. As each hidden layer consists of five nodes, there are five neurons in each of these layers. Each neuron in these layers processes information from the previous layer and passes the result to the next layer. The output layer 508 has one node N14. The output layer 508 may be responsible for producing the final result or prediction, such as the set of actions for the actor network or the set of rewards for the critic network.

Figure 6:
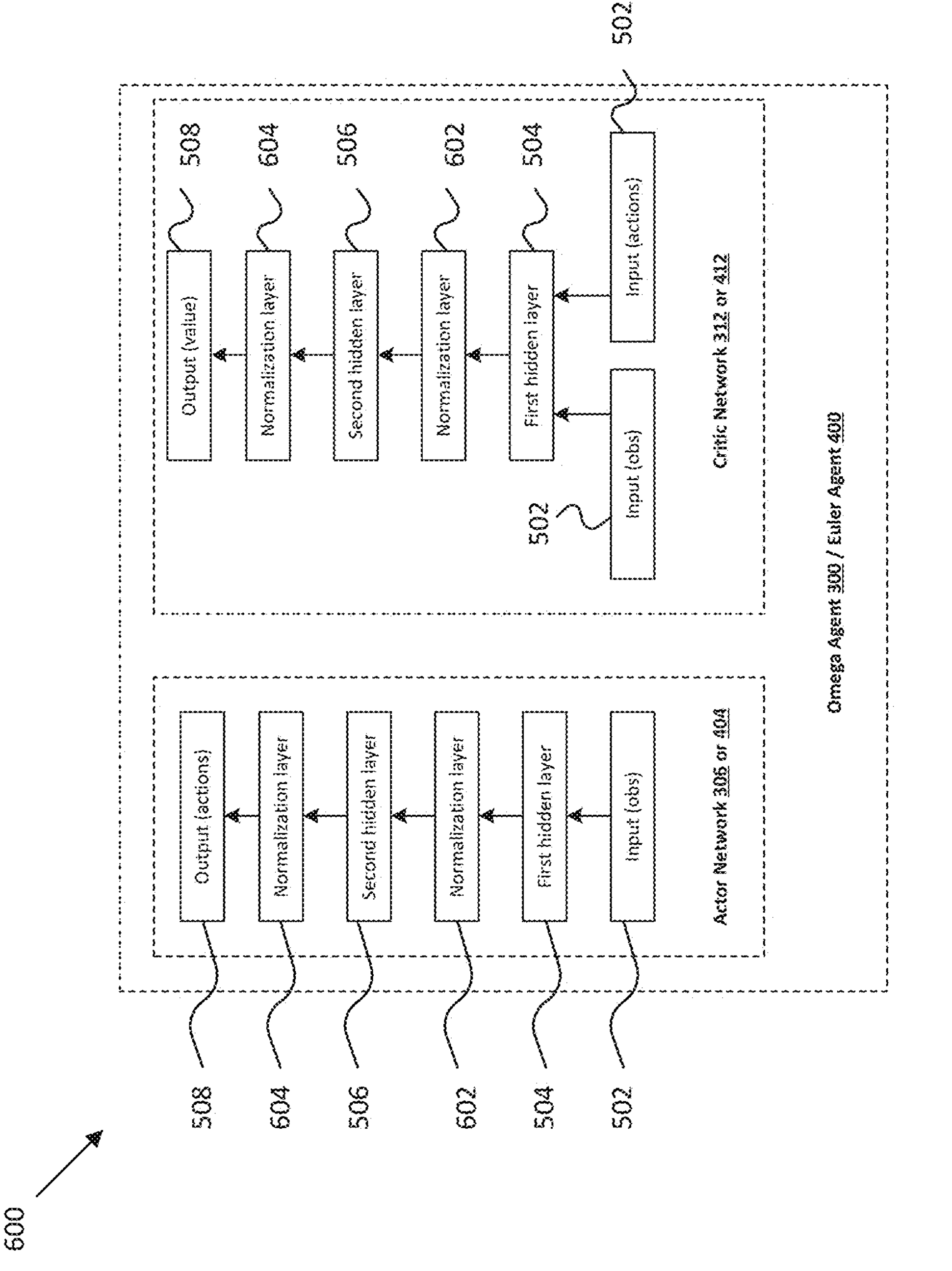
FIG. 6 is a block diagram illustrating one non-limiting example of an actor-critic network architecture that may be implemented in conjunction with the omega agent of FIG. 3 or the Euler agent of FIG. 4 according to aspects of the disclosed technology.

Omega agent 300 (FIG. 3) and Euler agent 400 (FIG. 4) may utilize an actor-critic network architecture like that illustrated in FIG. 6. FIG. 6 is a block diagram illustrating one non-limiting example of an actor-critic network architecture 600 that may be implemented in conjunction with either one of the omega agent 300 of FIG. 3 or the Euler agent 400 of FIG. 4 according to aspects of the disclosed technology.

Notably, each of the actor network 306 and the critic network 312 of FIG. 3, and the actor network 404 and the critic network 412 of FIG. 4 may be implemented by utilizing certain layers of the neural network 500 of FIG. 5, but with modifications as shown in FIG. 6 to implement an actor-critic network architecture.

For example, in this non-limiting example illustrated in FIG. 6, both the actor network 306/404 and the critic network 312/412 include additional normalization layers 602, 604. The normalization layers 602 and 604 may be designed to preprocess the input data, making it suitable for efficient training and improved model performance. The normalization layers 602 and 604 serve to standardize the input data by adjusting the distribution of values to have a mean of zero and a standard deviation of one. This normalization process helps stabilize and accelerate training, ensuring that different features or input dimensions are on a similar scale. Normalization layers may be used in deep learning models to address issues related to data distribution and gradients during training, contributing to faster convergence and enhanced model generalization. In addition, it should be noted that in the architecture shown in FIG. 6, the actor network 306/404 may take observations from the simulation environment as input 502 and may output actions 508 as next steps to interact with simulation environment, whereas the critic network 312/412 may take both observations and predicted actions as input 502, and may generate an output 508 that includes estimated value of those actions as rewards.

Figure 7:
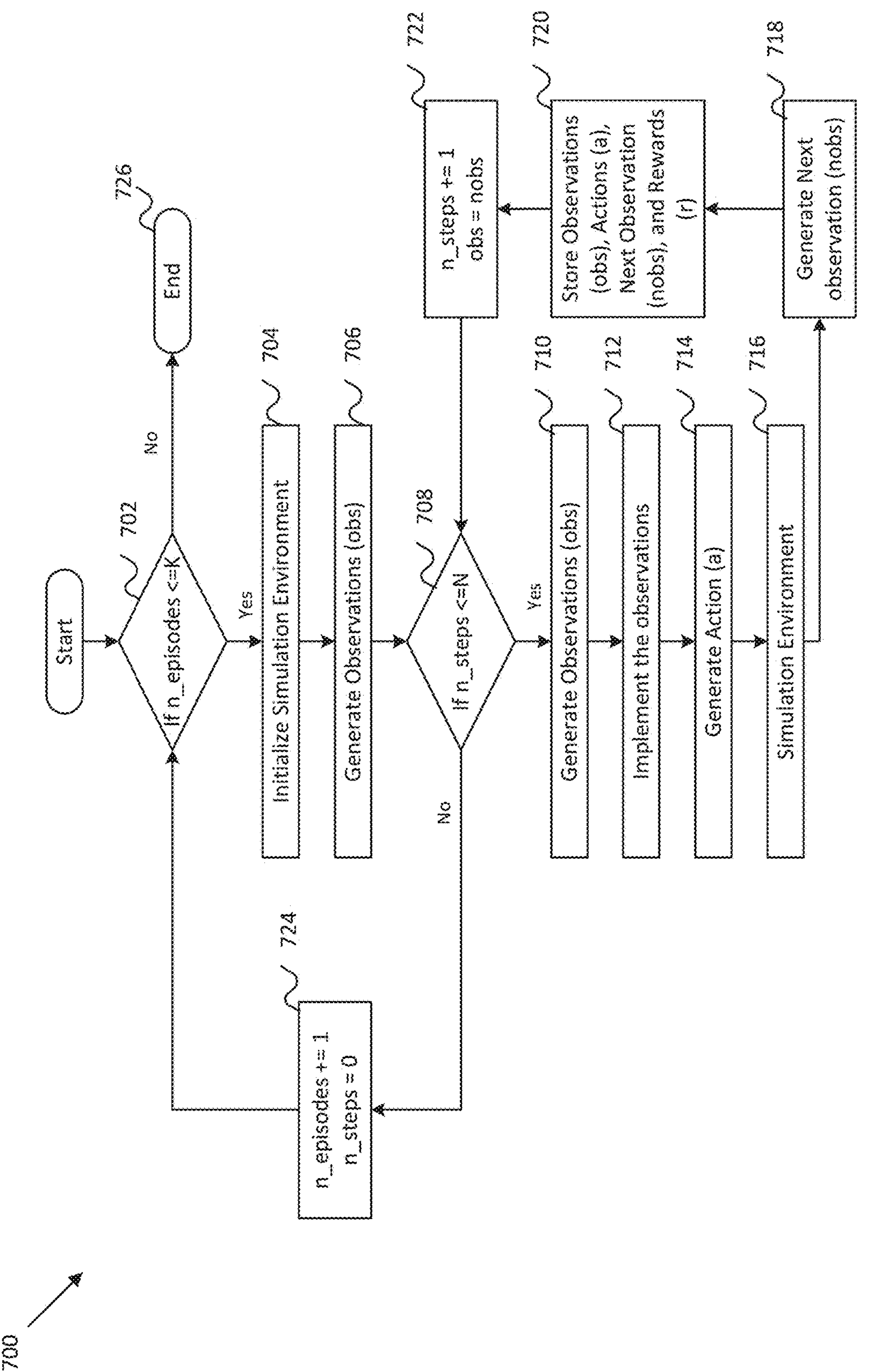
FIG. 7 is a flowchart illustrating a method of generating demonstration data according to aspects of the disclosed technology.

FIG. 7 is a flowchart illustrating a method 700 of generating demonstration data according to aspects of the disclosed technology. As used herein, "demonstration data" may refer to data stored in a buffer offline by applying classic control (e.g., a b-dot control in one non-limiting embodiment) to the system and exporting the results. In this example, the AI based controller 222A of FIG. 2D may generate multiple episodes, e.g., K episodes, of demonstration data by interacting with the simulation environment (e.g., simulation environment 308 of FIG. 3 or simulation environment 408 of FIG. 4). In one non-limiting embodiment, an "episode" may refer to a period of time it takes during which the satellite starts from a random position in space with random Euler angles and angular velocity until it is fully stabilized by the controller (e.g., in one non-limiting example within 20-30 hours due to the magnetorquers mechanism). In one non-limiting example of the disclosed technology, the AI based controller 222A may be implemented as a proportional-derivative (PD) controller to provide quick response to changes and disturbances in the orientation of the satellite 120. Within each episode, the AI based controller 222A may be interacting with the simulation environment in continuous steps until it reaches the maximum number of steps, e.g., N steps. As used herein, a "number of steps" may refer to a number of time steps within each episode. For instance, in one non-limiting implementation, it can be sampling data at any desired rate (e.g., every second, every five seconds, etc.

At 702, the AI based controller 222A may determine whether the number of episodes (n_episodes) is less than or equal to K. If at 702, the AI based controller 222A determines that the number of episodes is less than or equal to K, method 700 proceeds to 704, where the simulation environment can be initialized by setting up a virtual representation of the satellite 120 and its surroundings. Initialization of the simulation environment may include defining environmental parameters, specifying the satellite's initial state, incorporating physics and control models, accounting for external forces, and setting simulation time steps. Testing and validation are important for ensuring the accuracy of the simulation. This simulation environment may be used to assess the satellite's performance, control strategies, and response to mission scenarios before real-world deployment.

At 706, the AI based controller 222A generates initial observations based on the simulation. As used herein, "observations" may refer to the observed sensor data in the next time step after AI based controller applied actions to the simulation of satellite 120 in the simulation environment. At 708, the AI based controller 222A determines whether the number of steps (n_steps) is less than N. If at 708, the AI based controller 222A determines that the number of steps is less than N, method 700 proceeds to 710, where the AI based controller 222A generates observations based on the simulation of the satellite 120 in the simulation environment to obtain information regarding the orientation of the satellite. At 712, the AI based controller 222A implements the observations and at 714, AI based controller 222A generates the actions, such as the action (a), to control the orientation of the satellite by varying, for example, one or more of its angular rates and/or one or more of its Euler angles. In one embodiment, the action (a) may be one or more of varying a speed of rotation of reaction wheels, adjusting the strength and direction of magnetorquers, activating or deactivating thrusters, and the like. At 716, the environment simulator implements the generated actions in the simulation environment to determine the effect of the actions on the satellite 120 to generate rewards (r), and to generate new observations (nobs) at 718. At 720, the initial observations (obs), actions (a), next observations (nobs), and rewards (r) can be stored in the demonstration buffer 304 of FIG. 3.

At 722, the number of steps may be increased by one and the new observation (nobs) that was generated at 720 replaces the initial observation (obs). After 722, method 700 loops back to 708, which is executed again to determine whether the number of steps is less than or equal to N. Thus, the observations will be taken for N iterations, that is, for N different sets of actions and rewards. If at 708, the AI based controller 222A determines that the number of steps is greater than N, method 700 proceeds to 724, where the number of episodes is increased by one and the number of steps is reset to zero. After 724, method 700 loops back to 702, which is executed again to determine whether the number of episodes is less than or equal to K. Thus, the observations will be taken for K different episodes and for each episode the observations will be taken for N number of times. When the AI based controller 222A determines (at 702) that the number of episodes is greater than K, it indicates that the demonstration data has been successfully collected and may now be used to train the agents (e.g., omega agent 300 of FIG. 3 or Euler agent 400 of FIG. 4).

Figure 8:
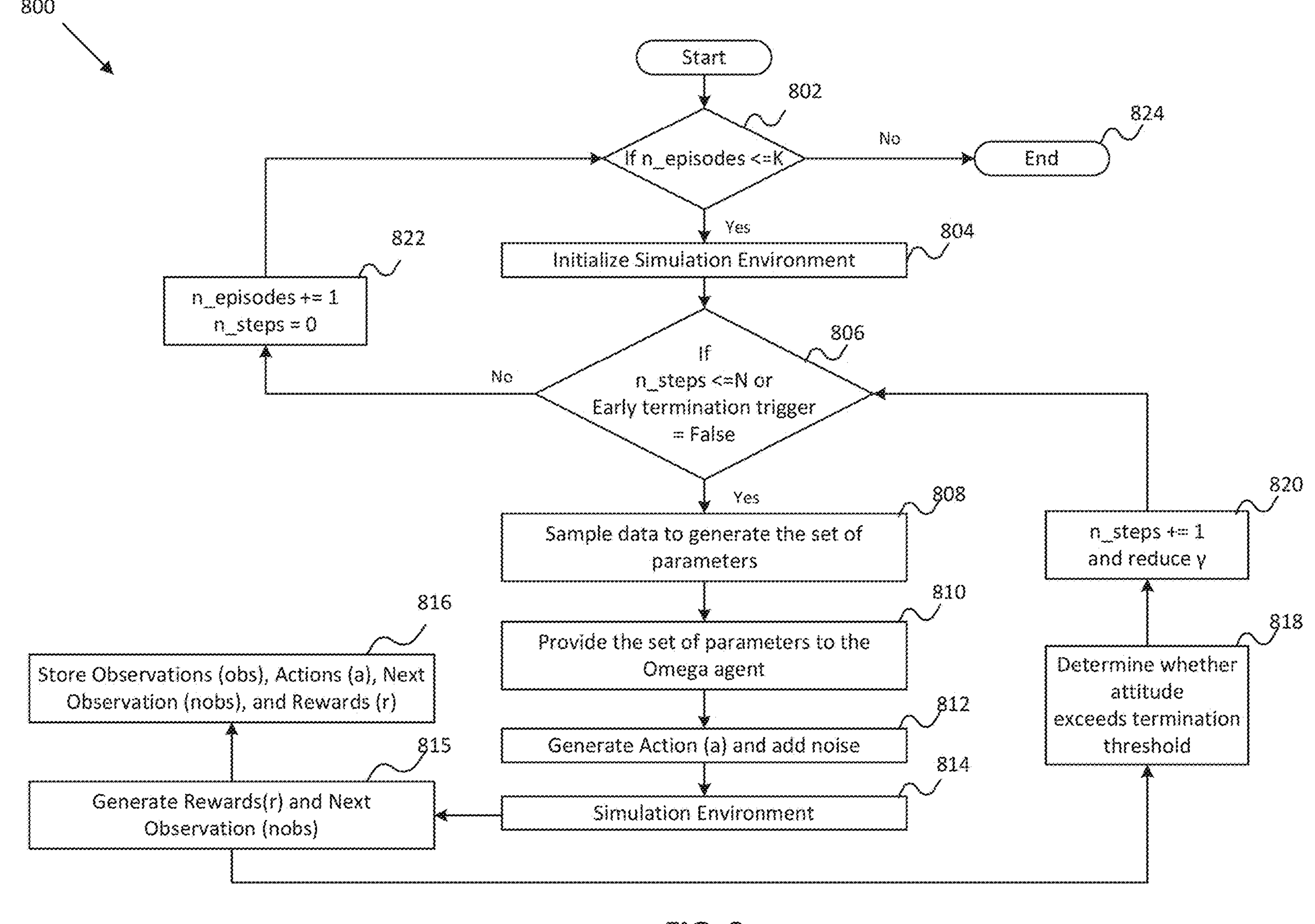
FIG. 8 is a flowchart illustrating a method of training omega agent according to aspects of the disclosed technology.

FIG. 8 is a flowchart illustrating a method 800 of training omega agent 300 according to aspects of the disclosed technology. Training (or implementation of) the omega agent 300 may include some steps that are to those performed during the generation of the demonstration data as illustrated in and described with reference to FIG. 7, but with some differences as will now be described with reference to FIG. 8. At 802, the AI based controller 222A may determine whether the number of episodes (n_episodes) is less than or equal to K. When the AI based controller 222A determines (at 802) that the number of episodes is less than or equal to K, the method 800 proceeds to 804, where the simulation environment is initialized by setting up a virtual representation of the satellite 120 and its surroundings. As used herein, "virtual representation of the satellite" may refer to a full model of the satellite simulated in an external source with a very high fidelity providing extremely accurate status of the system.

At 806, the AI based controller 222A determines whether the number of steps (n_steps) is less than N or whether early termination trigger is false. As used herein, "the early termination trigger" may refer to a condition or event that causes the method 800 to end. For example, an early termination trigger may occur (and be true), if the satellite angular velocity is outside of a controllable range. In this case, the early termination trigger may be set to true, and the method 800 may end. This is due to the fact that going to a higher range of angular velocity will make the satellite stabilize in a much longer time, which is not useful.

When the AI based controller 222A determines (at 806) that either the number of steps is less than N or that the early termination trigger is false, the method 800 proceeds to 808, where the AI based controller 222A samples data to generate the set of parameters associated with the orientation of the satellite 120. In one embodiment, the sampling of the data is performed from demo data and agent data based on a weight value, such as $\gamma$. The demo data is the data that is generated during the generation of the demonstration data in FIG. 7. The agent data is the data generated during the previous iteration of training the omega agent 300 (to the extent there is data generated during a previous iteration). In one non-limiting example, "$\gamma$*n" instances of demo data may be sampled and "$(1-\gamma)$*n" instances of agent data may be sampled to obtain the set of parameters to be inputted to the omega agent 300. Again, as noted above, "the set of parameters" may include, but is not limited to, for example, one or more of a set of angular rates, a set of Euler angles, a set of quaternions, the position of the satellite 120 (e.g., position derived from the magnetic field vector), pitch, roll, yaw, direction, attitude-quaternion vector, principal axes, and sun and earth angles.

At 810, the set of parameters may be provided to the omega agent 300. At 812, omega agent 300 generates actions, such as the action (a), and adds noise to the generated actions. As used herein, an "action" may represent to a decision or a move that an agent can take in a given state. Actions are the different choices or operations available to the agent at any given moment. The set of all possible actions is known as the action space. The agent's objective is to learn a policy, a mapping from states to actions, which maximizes its cumulative reward over time. There are many different actions that can be used to control the spacecraft, and the actions can vary depending on the implementation and the equipment that is provided on the spacecraft (e.g., satellite) to control the attitude and stabilize the spacecraft. For example, the actions could involve adjusting the angles of gimbaled thrusters, changing the speed of reaction wheels, or varying the current to electromagnets for magnetic torque. These actions determine the satellite's attitude and are selected from a continuum of possible orientations and movement speeds. The complete range of actions forms what is known as the action space.

In one embodiment, the action specifies an amount of a variable that is controlled from a minimum value to a maximum value. For example, the "action" may be the amount of torque that is applied, from a minimum torque to a maximum torque, in the x, y, and z directions. For instance, when a spacecraft implements magnetorquers, the action can be in the form of dipole for them in all x, y, and z directions. For instance, in one implementation, the actions may be the amount of dipole applied to magnetorquers in each direction. In one implementation, these actions are all between-1, 1 in 3 directions (x, y, z), which will provide the range of actions in each direction between min and max of dipole, for example, for x axis this number can be different than z due to the size of magnetorquer. As another example, when a spacecraft implements reaction wheel(s), the action can also be in the form of the torque that is applied via the reaction wheel(s).

At 814, the generated actions are implemented in the simulation environment to determine the effect of the actions on the satellite 120. At 815, the omega agent 300 can generate or estimate one or more rewards (r) and next observations (nobs).

As used herein, an "observation" may refer to the information received by the agent from its environment at a particular time step. Observations provide the current state of the environment, allowing the agent to make informed decisions about which action to take. The observation space encompasses all possible states the environment can be in, and it plays a crucial role in helping the agent understand the consequences of its actions. An observation may refer to the tuple of going from one state to a new state, given an action, which results in a reward for this tuple.

As used herein, a "reward" may refer to a numerical signal provided by the environment to the agent after it takes a particular action in a specific state. It represents the immediate benefit or cost associated with that action given that state. The goal of the agent is to learn a policy that maximizes the cumulative sum of rewards over time. Rewards serve as feedback signals guiding the learning process, helping the agent adapt its behavior to achieve its objectives. A reward may be defined to quantify how far away the system is from the desired stable point.

At 816, the omega agent 300 can store the initial observations (obs), actions (a), the next observations (nobs), and rewards (r) as the agent data.

At 818, the AI based controller 222A determines whether the attitude of the satellite exceeds termination threshold. In one embodiment, if the attitude of the satellite exceeds termination threshold, the early termination trigger is activated, such that early termination trigger is true. By contrast, if the attitude of the satellite does not exceed termination threshold, early termination trigger is not activated, such that early termination trigger is false.

As explained above, the weight value (γ) may be adjusted by the backpropagation process and may have a wide range of possible values. At 820, where the number of steps is increased by one and the weight value (γ) is reduced by a suitable amount (e.g., value between 1% and 0.01%) based on the training progress of the omega agent 300. After 820, the method 800 loops back to 806, where it is determined whether the number of steps is less than or equal to N or if the early termination trigger is false. Thus, the observations will be taken for N iterations that is for N different sets of actions and rewards or until the attitude of the satellite exceeds the termination threshold. When the AI based controller 222A determines (at 806) that the number of steps is greater than N or that the early termination trigger is true, the method proceeds to 822.

At 822, the number of episodes is increased by one and the number of steps is reset to zero. After 822, the method 800 loops back to 802, where it is again determined whether the number of episodes is less than or equal to K. Thus, the observations will be taken for K different episodes and for each episode the observations will be taken for N number of times. If at 802, the AI based controller 222A determines that the number of episodes is greater than K, it indicates that the training of the omega agent 300 is successfully completed, and the method 800 ends.

Figure 9:
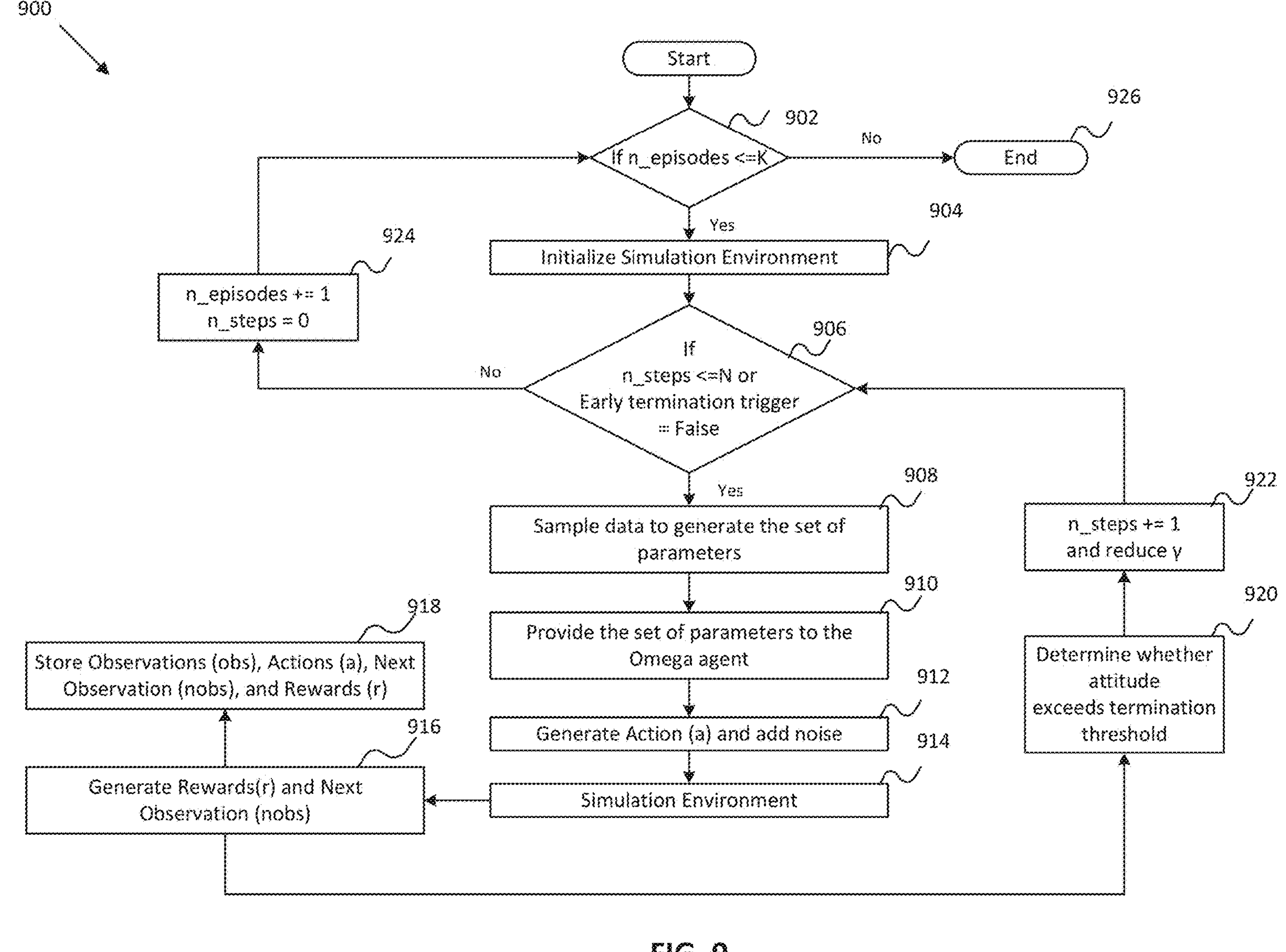
FIG. 9 is a flowchart illustrating a method of training Euler agent according to aspects of the disclosed technology.

FIG. 9 is a flowchart illustrating a method 900 of training Euler agent 400 according to aspects of the disclosed technology. Method 900 begins at 902, where the AI based controller 222A may determine whether the number of episodes (n_episodes) is less than or equal to K. When the AI based controller 222A determines (at 902) that the number of episodes is less than or equal to K, the method 900 proceeds to 904, where the simulation environment is initialized by setting up a virtual representation of the satellite 120 and its surroundings.

At 906, the AI based controller 222A determines whether the number of steps (n_steps) is less than N or whether early termination trigger is false. When the AI based controller 222A determines (at 906) that the number of steps is less than N or that the early termination trigger is false, the method 900 proceeds to, where the AI based controller 222A samples data to generate the set of parameters associated with the orientation of the satellite 120. The set of parameters may include, but is not limited to, at least one of a set of angular rates, a set of Euler angles, a set of quaternions, and a position of the satellite 120. In one embodiment, the sampling of the data is performed from demo data and agent data based on a weight value, such as γ. The demo data is the data that is generated during the generation of the demonstration data in FIG. 7. The agent data is the data generated in the previous iteration of training the Euler agent 400 (to the extent that data was generated in the previous iteration of training the Euler agent 400). In one non-limiting example, "γ*n" instances of demo data may be sampled and "(1−γ)*n" instances of agent data may be sampled to obtain the set of parameters to be input to the Euler agent 400. At 910, the set of parameters may be provided to the Euler agent 400. At 912, Euler agent 400 generates actions, such as the action (a), and adds noise to the generated actions (describe above). At 914, the generated actions are implemented in the simulation environment to determine the effect of the actions on the satellite 120.

At 916, the Euler agent 400 can generate or estimate one or more rewards (r) and one or more next observations (nobs), as described above. At 918, the Euler agent 400 can store the initial observations (obs), actions (a), next observations (nobs), and rewards (r) as the agent data in the experiment buffer 402 of FIG. 4.

At 920, the AI based controller 222A determines whether the attitude of the satellite exceeds a termination threshold. In one embodiment, if the attitude of the satellite exceeds the termination threshold, the early termination trigger is activated, such that early termination trigger is true. By contrast, when the attitude of the satellite does not exceed termination threshold, the early termination trigger is not activated, such that early termination trigger is false. At 922, the number of steps is increased by one and the weight value (γ) is reduced by a suitable amount based on the training progress of the Euler agent 400. The method 900 then proceeds to 906, where the AI based controller 222A determines whether the number of steps is less than or equal to N or whether the early termination trigger is false. Thus, the observations will be taken for N iterations, that is for N different sets of actions and rewards, or until the attitude of the satellite exceeds the termination threshold. When the AI based controller 222A determines (at 906) that the number of steps is greater than N or that the early termination trigger is true, the method 900 proceeds to 924.

At 924, the AI based controller 222A increases the number of episodes by one and the number of steps is reset to zero, and the method proceeds to 902, where the AI based controller 222A determines whether the number of episodes is less than or equal to K. Thus, the observations will be taken for K different episodes and for each episode the observations will be taken for N number of times. When the AI based controller 222A determines (at 902) that the number of episodes is greater than K, it indicates that the training of the Euler agent 400 has been successfully completed and the method 900 ends at 926.

FIGS. 10A-10D, collectively, represent a flowchart illustrating a method 1000 of implementing a reinforcement learning model for controlling a satellite according to aspects of the disclosed technology. FIGS. 10A-10D are directed towards the implementation phase of the reinforcement learning model to control the orientation of the satellite 120.

Figures 10A, 10B:
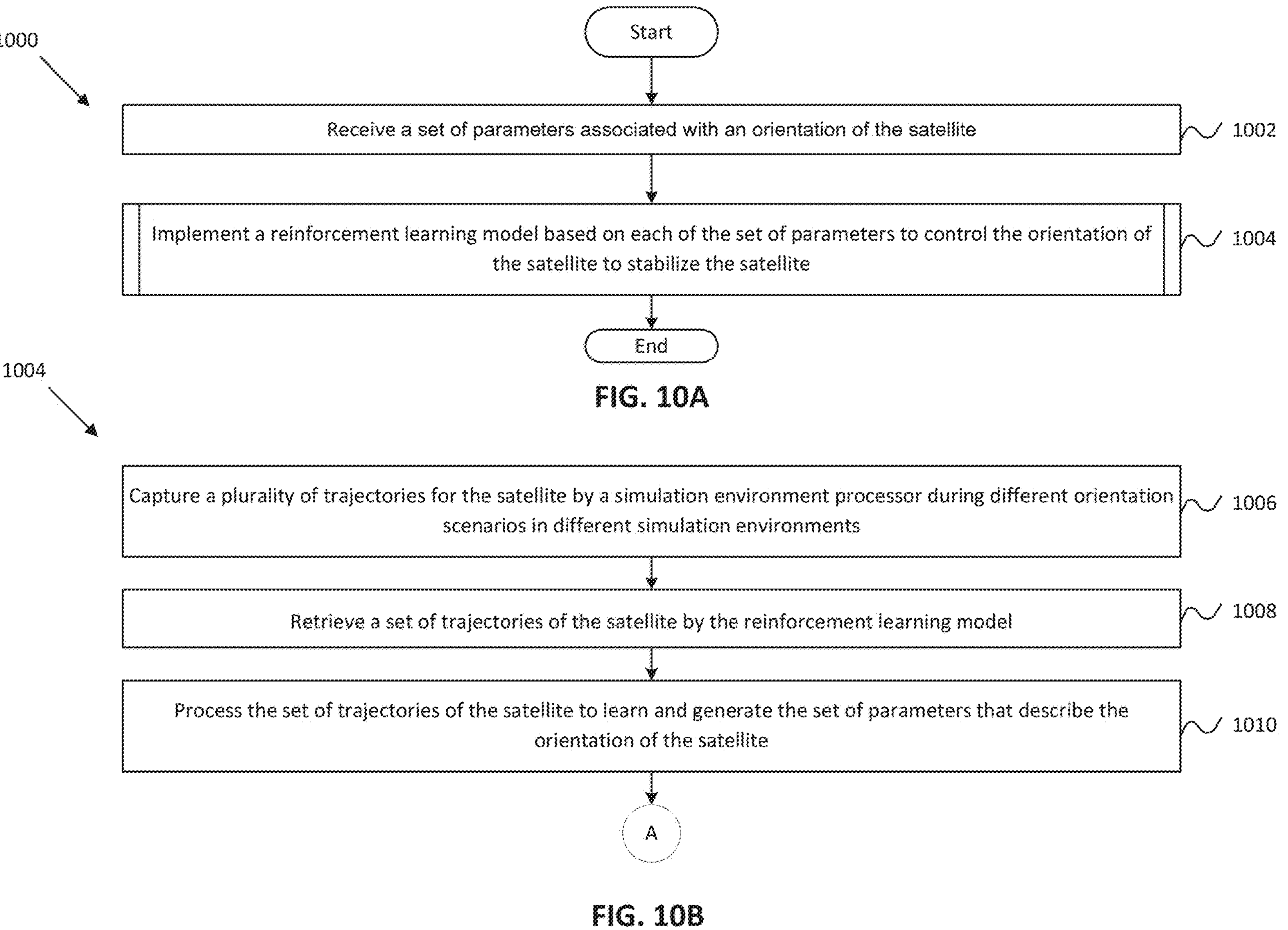
FIGS. 10A-10D, collectively, represent a flowchart illustrating a method of implementing a reinforcement learning model for controlling a satellite according to aspects of the disclosed technology.

Referring now to FIG. 10A, at 1002, the AI based controller 222A receives a set of parameters associated with an orientation of the satellite 120. The set of parameters includes a set of angular rates and a set of Euler angles. At 1004, the AI based controller 222A may implement a reinforcement learning model, based on each of the set of parameters, to control the orientation of the satellite 120 to stabilize the satellite 120. In one embodiment, the reinforcement learning model may be based, for example, on an actor-critic deep deterministic policy gradient model. When the satellite 120 is navigating through space, external factors may cause the satellite 120 to tumble or to change the orientation of the satellite 120. The reinforcement learning model, which is implemented via the actor-critic network, may control the parameters associated with the orientation of the satellite 120 by executing a set of actions on the satellite to detumble the satellite and correct the orientation of the satellite 120.

In one embodiment, the reinforcement learning model can be implemented (at 1004 of FIG. 10A) by executing the method 1004 as shown in FIG. 10B. In FIG. 10B, implementation of the reinforcement learning model may begin at 1006, where a simulation environment processor, such as the environment simulator 308 of FIG. 3, captures a plurality of trajectories for the satellite 120 during different orientation scenarios in different simulation environments. Each trajectory comprises data that represents a particular orientation of the satellite at a particular time.

At 1008, the reinforcement learning model retrieves a set of trajectories of the satellite from the memory 210 of the flight computer 202. At 1010, the reinforcement learning model processes the set of trajectories of the satellite to learn and generate the set of parameters that describe the orientation of the satellite. The set of parameters are processible by an agent, such as an omega agent 300 or the Euler agent 400, to generate the set of actions for controlling the satellite.

With continued reference to FIG. 10B, the method 1004 of FIG. 10B continues at 1012, where the actor network, such as the actor network 306 of FIG. 3 or the actor network 404 of FIG. 4, predicts, based on each of the set of parameters, a set of actions to be implemented by the satellite 120 to control the orientation of the satellite 120. At 1014, the environment simulator 308 or 408 implements the set of actions in a simulation environment. At 1016, the critic network, such as the critic network 312 of FIG. 3 or the critic network 412 of FIG. 4, predicts an outcome of the implementing of the set of actions to generate a set of rewards. At 1018, the AI based controller 222A compares the outcome of the implementing of the set of actions and a desired outcome to generate the set of rewards. When the outcome of implementing a first action of the set of actions is within a predefined range of the desired outcome, the value of a first reward of the set of rewards corresponding to the first action is high. When the outcome of implementing the first action of the set of actions exceeds the predefined range of the desired outcome, the value of the first reward of the set of rewards corresponding to the first action is low. Similarly, the outcomes of implementing each of the set of actions is compared with the desired outcome, to generate the set of rewards. The rewards being high indicate that the implementation of the actions is successful in stabilizing the satellite by reducing the angular velocities and the Euler angles within the desired thresholds.

At 1020, the omega agent 300 reduces a value of each of the set of angular rates such that each of the set of angular rates is within a first predefined threshold. After each of the set of angular rates is within the first predefined threshold, at 1022, the Euler agent 400 reduces the value of each of the set of Euler angles such that each of the set of Euler angles is within a second predefined threshold. In one embodiment, the omega agent and the Euler agent implement the reinforcement learning model to reduce the values of the set of angular rates within the first predefined threshold and the set of Euler angles within the second predefined threshold. In alternate embodiments, the omega agent 300 and the Euler agent 400 may implement any suitable machine learning model or algorithm to reduce the values of the set of angular rates within the first predefined threshold and the set of Euler angles within the second predefined threshold. In one non-limiting example, the first predefined threshold is 0.01 rad/s, and the second predefined threshold is 1.14 degrees. In one embodiment, the second predefined threshold may be different than the first predefined threshold. In another embodiments, the second predefined threshold may be same as the first predefined threshold. In addition, in some embodiments, the first predefined threshold can be different for each angular velocity of the set of angular velocities, and each first predefined threshold can be the same or different as each of the other first predefined threshold. Similarly, the second predefined threshold can be different for each Euler angle of the set of Euler angles, and each second predefined threshold can be the same or different as each of the other second predefined threshold.

Further, in some embodiments, the omega agent 300 and/or the Euler agent 400 may be implemented based on an actor-critic network, such as the actor-critic network that is illustrated and described with reference to FIGS. 3-6.

Figure 10C:
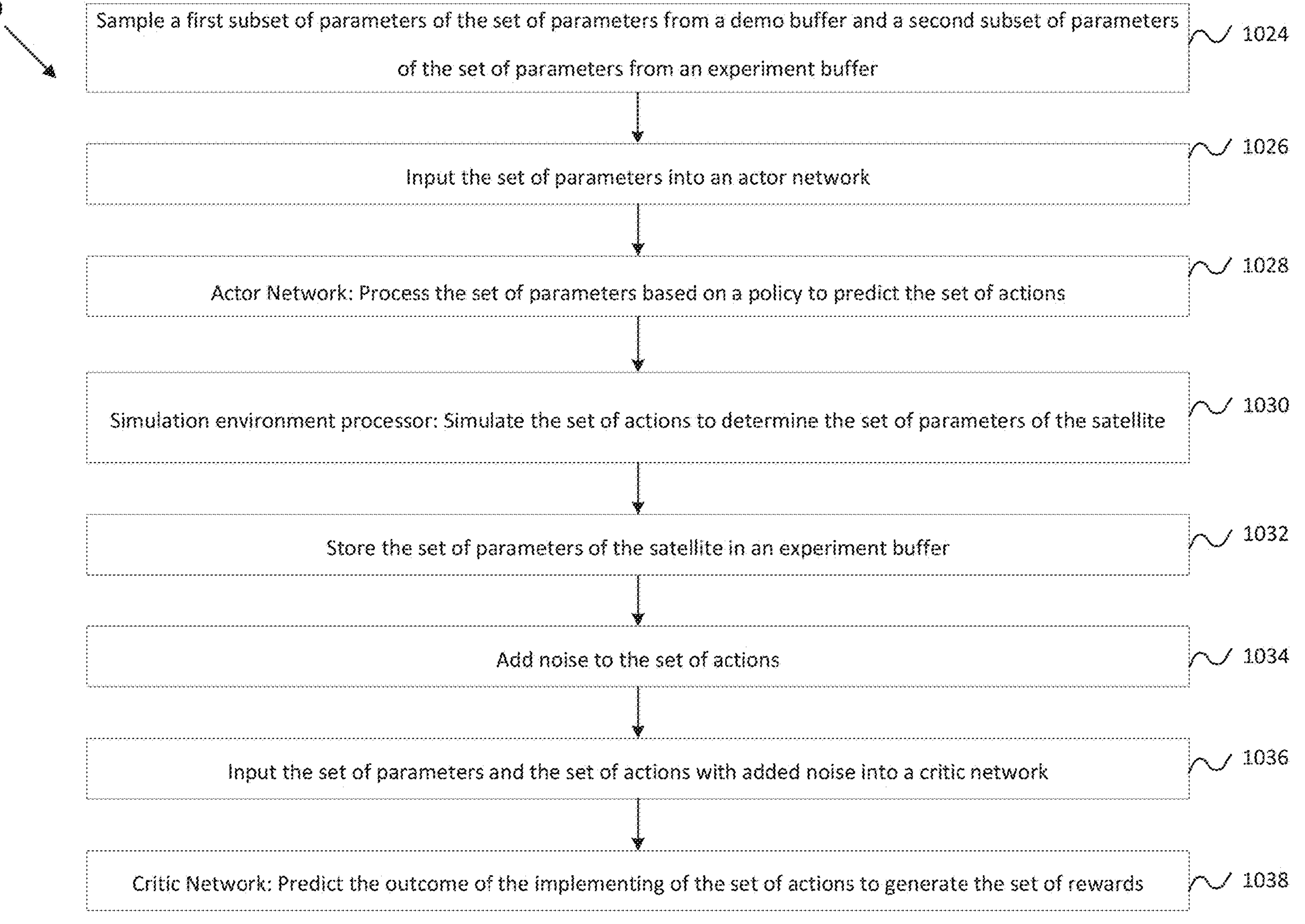

In one embodiment or implementation of step 1020 of FIG. 10B, the omega agent 300 may reduce the value of each of the set of angular rates (such that each of the set of angular rates is within a first predefined threshold) by executing a method 1020 as shown in FIG. 10C. The omega agent 300 may begin the method 1020 of FIG. 10C at 1024 of FIG. 10C, where the omega agent 300 samples a first subset of parameters of the set of parameters from a demonstration buffer 304 and a second subset of parameters of the set of parameters from an experiment buffer 302. In one aspect of the disclosed technology, the first subset of parameters and the second subset of parameters is sampled based on weight values a and B such that the set of parameters are multiplied by a to obtain the first subset of parameters and the set of parameters are multiplied by B to obtain the second subset of parameters. At 1026, the mixer 305 inputs the set of parameters (e.g., the first and second subset of parameters) into the actor network 306. The set of parameters may include the set of angular rates, a set of quaternions, and a position of the satellite 120. At 1028, the actor network 306 processes the set of parameters based on a policy to predict the set of actions. Based on the degree of change in the orientation or the degree of tumbling of the satellite 120 the actor network 306 may predict the set of actions that may help the satellite 120 to reduce the tumbling by correcting the angular velocities and correct the orientation of the satellite 120 by controlling the Euler angles.

At 1030, the environment simulator 308 executes the simulation environment processor to simulate the set of actions to determine the set of parameters of the satellite 120. At 1032, the environment simulator 308 stores the set of parameters of the satellite 120 in an experiment buffer, such as the experiment buffer 302. The set of parameters stored in the experiment buffer 302 may be sampled at the next iteration of the predicting the set of actions during the training of the reinforcement learning model. At 1034, the mixer 310 adds noise to the set of actions and the set of parameters. At 1036, the mixer 310 inputs the set of actions with added noise into a critic network. At 1038, the critic network predicts the outcome of the implementing of the set of actions to generate the set of rewards. As described with reference to 1018 of FIG. 10B, the set of rewards may be generated by comparing the outcome of the implementing of the set of actions with a desired outcome.

Figure 10D:
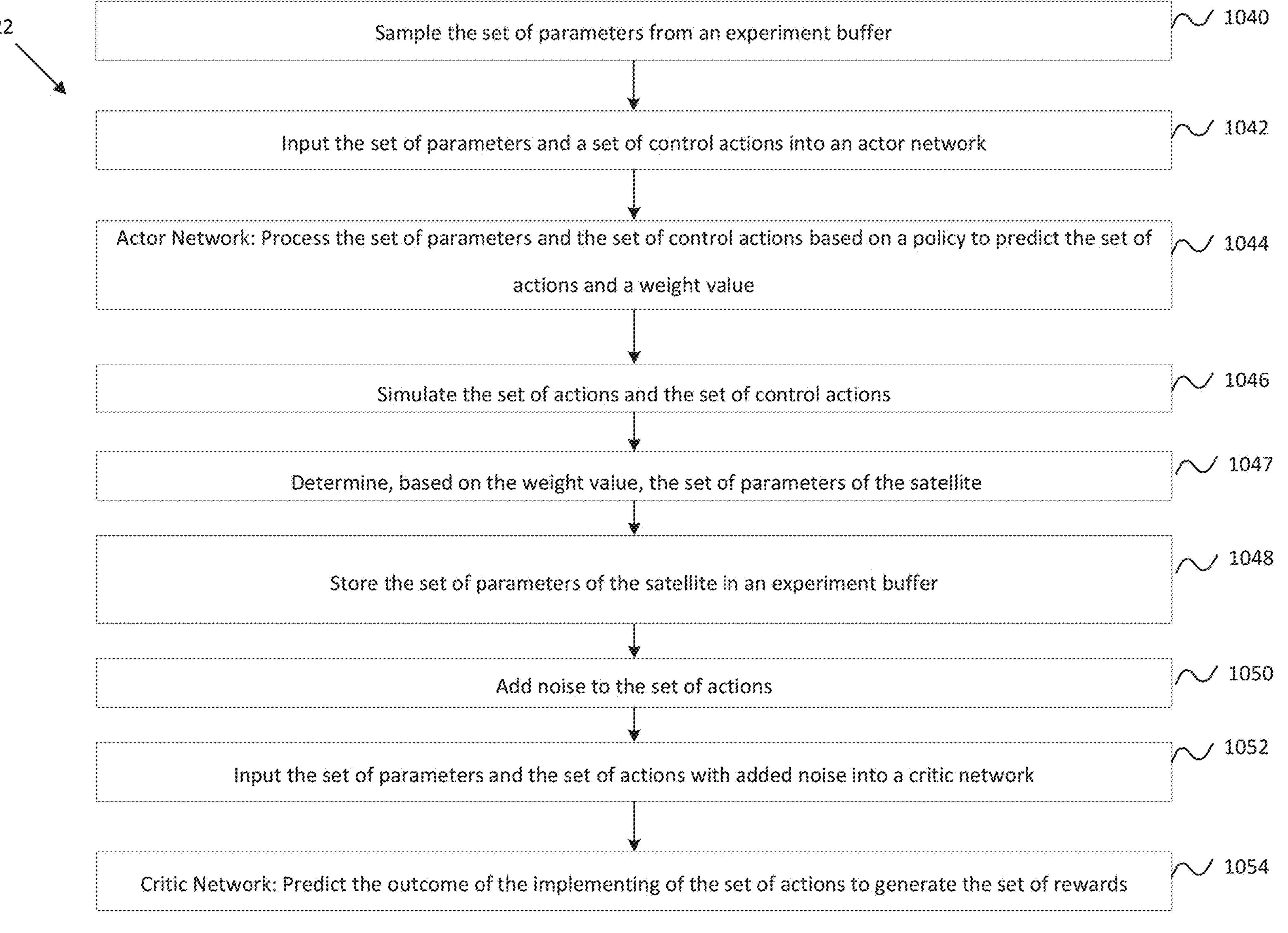

In one embodiment or implementation of step 1022 of FIG. 10B, the Euler agent 400 may reduce the value of each of the set of Euler angles by executing a method 1022 as shown in FIG. 10D. The Euler agent 400 may begin the method 1022 of reducing the value of each of the set of Euler angles at 1040 of FIG. 10D, where the Euler agent 400 samples the set of parameters from an experiment buffer 402. At 1042, the Euler agent 400 inputs the set of parameters and a set of control parameters into an actor network. In one embodiment, the set of parameters may include the set of angular rates, a set of quaternions, and a position of the satellite 120. In one non-limiting embodiment, the set of control parameters may include the set of angular rates, a set of quaternions, and a position of the satellite 120 that are generated by the B-dot controller 222B. At 1044, the actor network 404 processes the set of parameters and the set of control parameters based on a policy (to predict the set of actions) and a weight value γ. Based on the degree of change in the orientation or the degree of tumbling of the satellite 120 the actor network may predict the set of actions that may help the satellite 120 to reduce the tumbling by correcting the angular velocities and correct the orientation of the satellite 120 by controlling the Euler angles.

At 1046, the environment simulator 408 simulates the set of actions and the set of control actions. After simulating the set of actions and the set of control actions, the method 1022 proceeds to 1047, where the environment simulator 408 determines, based on the weight value γ, the set of parameters of the satellite 120. At 1048, the environment simulator 408 stores the set of parameters of the satellite 120 in an experiment buffer, such as the experiment buffer 402. The set of parameters stored in the experiment buffer 402 may be sampled at the next iteration of the predicting the set of actions. At 1050, the mixer 410 adds noise to the set of actions. At 1052, the mixer 410 inputs the set of parameters and the set of actions with added noise into a critic network. At 1054, the critic network 412 predicts the outcome of the implementing of the set of actions to generate the set of rewards. As described with reference to 1018 of FIG. 10B, the set of rewards may be generated by comparing the outcome of the implementing of the set of actions with a desired outcome.

Figure 11A:
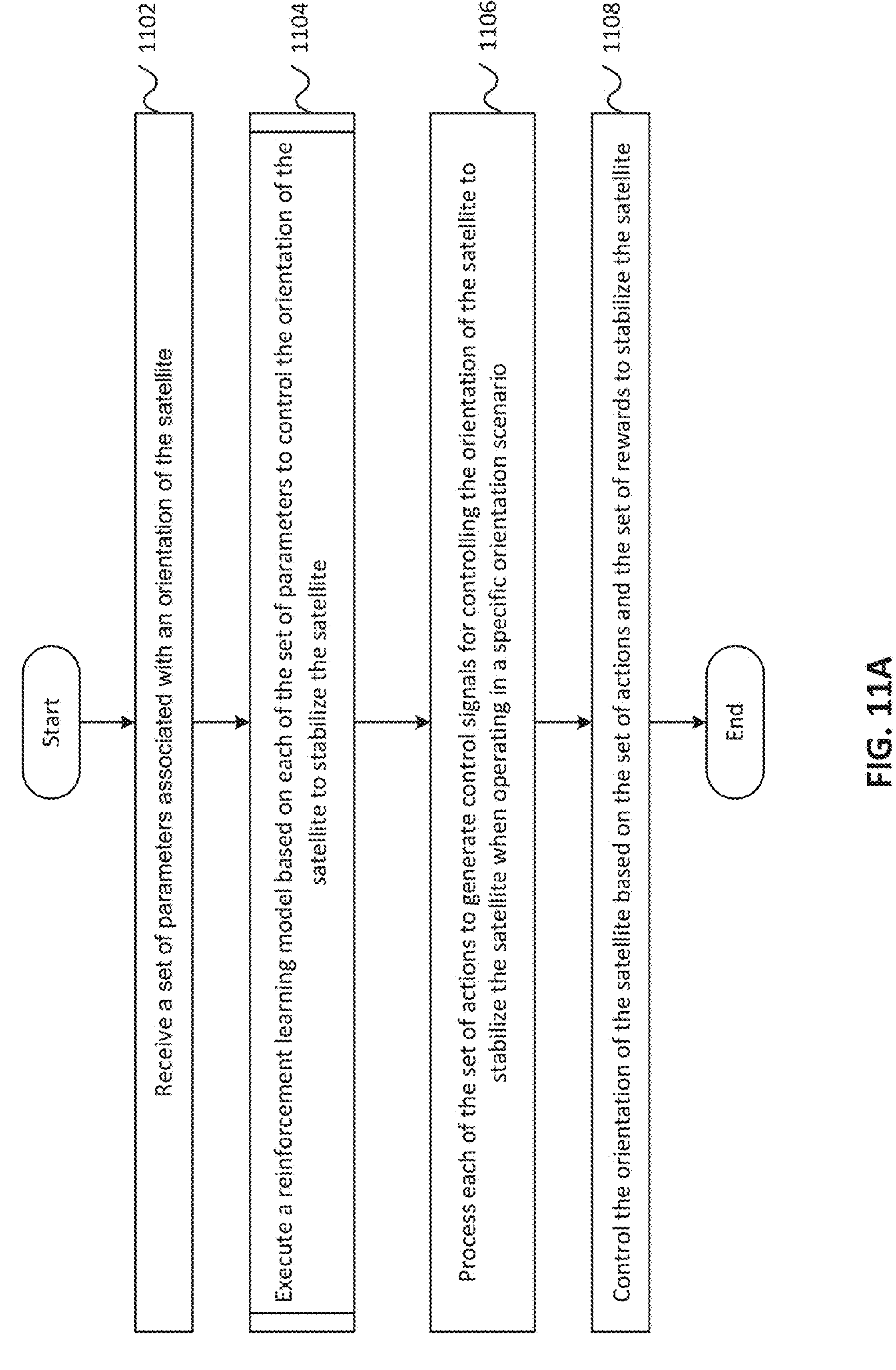
FIGS. 11A-11C, collectively, represent a flowchart illustrating a method of controlling a satellite according to aspects of the disclosed technology.
Figure 11B:
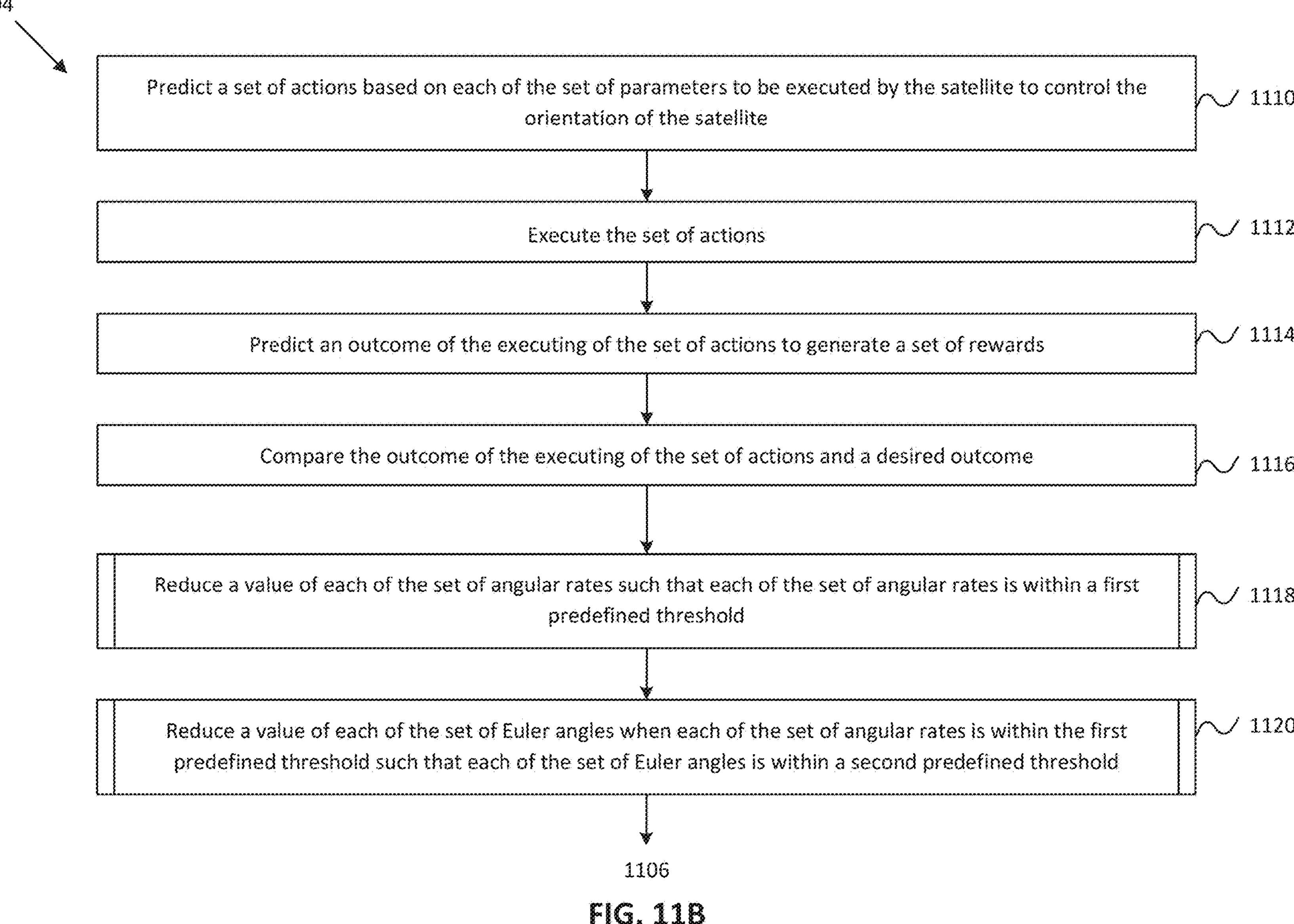
Figure 11C:
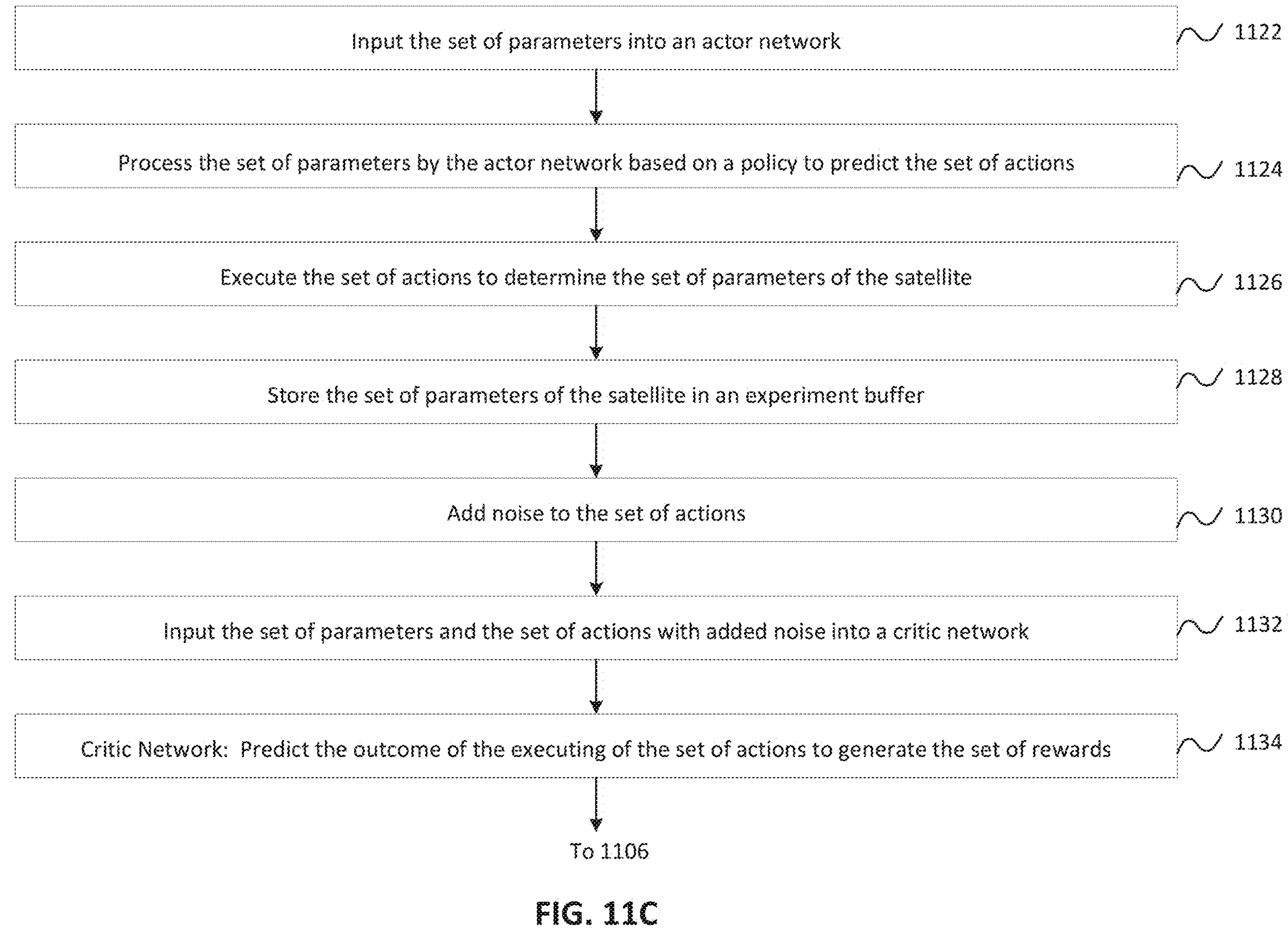

FIGS. 11A-11C, collectively, represent a flowchart illustrating a method 1100 of controlling a satellite 120 according to aspects of the disclosed technology. FIGS. 11A-11C are directed towards the execution phase of a reinforcement learning model to control the orientation of the satellite 120 to stabilize the satellite.

Referring now to FIG. 11A, at 1102, an AI based controller 222A receives a set of parameters associated with an orientation of the satellite 120. In one non-limiting embodiment, the set of parameters may include, for example, a set of angular rates and a set of Euler angles. At 1104, based on each of the set of parameters, the reinforcement learning model is executed to control the orientation of the satellite 120 to stabilize the satellite 120. In one non-limiting embodiment, the reinforcement learning model may be, or may be based on, an actor-critic network, such an actor-critic deep deterministic policy gradient model. When the satellite 120 is navigating through space, a lot of external factors may cause the satellite 120 to tumble or to change the orientation of the satellite 120. As will be explained below, a reinforcement learning model implemented based on an actor-critic network may control the parameters associated with the orientation of the satellite 120 by executing a set of actions on the satellite to detumble the satellite and correct the orientation of the satellite 120.

In one non-limiting embodiment, the reinforcement learning model can be executed to control the orientation of the satellite 120 (at 1104 of FIG. 11A) by executing the method 1104 as shown in FIG. 11B. In FIG. 11B, execution of the reinforcement learning model may begin at 1110, where the actor network, such as the actor network 306 of FIG. 3 or the actor network 404 of FIG. 4, may predict, based on each of the set of parameters, a set of actions to be executed by the satellite 120 to control the orientation of the satellite 120. At 1112, the actuators 240 execute the set of actions. The method 1104 then proceeds to 1114, where the critic network, such as the critic network 312 of FIG. 3 or the critic network 412 of FIG. 4, predicts an outcome of the executing of the set of actions to generate a set of rewards.

At 1116, the critic network may compare the outcome of the executing of the set of actions and a desired outcome to generate the set of rewards.

When the outcome of executing a first action of the set of actions is within a predefined range of the desired outcome, the value of a first reward of the set of rewards corresponding to the first action is high. When the outcome of executing the first action of the set of actions exceeds the predefined range of the desired outcome, the value of the first reward of the set of rewards corresponding to the first action is low. Similarly, the outcomes of implementing each of the set of actions is compared with the desired outcome, to generate the set of rewards. The rewards being high indicate that the implementation of the actions is successful in stabilizing the satellite by reducing the angular velocities and the Euler angles within the desired thresholds.

At 1118, the omega agent 300 reduces the value of each of the set of angular rates such that each of the set of angular rates is within a first predefined threshold. After each of the set of angular rates is within the first predefined threshold, at 1120, the Euler agent 400 reduces the value of each of the set of Euler angles such that each of the set of Euler angles is within a second predefined threshold.

In one embodiment, the omega agent and the Euler agent execute the reinforcement learning model to reduce the values of the set of angular rates within the first predefined threshold and the set of Euler angles within the second predefined threshold. In alternate embodiments, the omega agent 300 and the Euler agent 400 may execute any suitable machine learning algorithm to reduce the values of the set of angular rates within the first predefined threshold and the set of Euler angles within the second predefined threshold. In one non-limiting example, the first predefined threshold is 0.01 rad/s, and the second predefined threshold is 1.14 degrees. In one embodiment, the second predefined threshold may be different than the first predefined threshold. In another embodiments, the second predefined threshold may be same as the first predefined threshold. In addition, in some embodiments, the first predefined threshold can be different for each angular velocity of the set of angular velocities, and each first predefined threshold can be the same or different as each of the other first predefined threshold. Similarly, the second predefined threshold can be different for each Euler angle of the set of Euler angles, and each second predefined threshold can be the same or different as each of the other second predefined threshold.

Further, in some embodiments, the omega agent 300 and/or the Euler agent 400 may be implemented based on an actor-critic network, such as the actor-critic network that is illustrated and described with reference to FIGS. 3-6.

In one non-limiting embodiment, the omega agent 300 may reduce the value of each of the set of angular rates (at 1118 of FIG. 11B) by executing steps 1122 to 1134 of the reduction method as shown in FIG. 11C. Likewise, the Euler agent 400 may also reduce the value of each of the set of Euler angles (at 1120 of FIG. 11B) by executing steps 1122 to 1134 of the reduction method as shown in FIG. 11C.

In either implementation, the reduction method of FIG. 11C may begin at 1122, where the mixer 315 inputs the set of parameters into an actor network. In one non-limiting embodiment, the set of parameters may include the set of angular rates, a set of quaternions, and a position of the satellite 120.

At 1124, the actor network 306 may process the set of parameters based on a policy to predict the set of actions. Based on the degree of change in the orientation or the degree of tumbling of the satellite 120 the actor network may predict the set of actions that may help the satellite 120 to reduce the tumbling by correcting the angular velocities and correcting the orientation of the satellite 120 by controlling the Euler angles.

At 1126, the actuators 240 execute the set of actions to determine the set of parameters of the satellite 120. At 1128, the reinforcement learning model stores the set of parameters of the satellite 120 in an experiment buffer, such as the experiment buffer 302. The set of parameters stored in the experiment buffer 302 may be sampled at the next iteration of the predicting the set of actions.

At 1130, the mixer 410 adds noise to the set of actions, and at 1132, the set of parameters and the set of actions with added noise are input into a critic network.

At 1134, the critic network 412 predicts the outcome of the executing of the set of actions to generate the set of rewards, and the method 100 proceeds to 1106. As described at 1116 of FIG. 11B, the set of rewards may be generated by comparing the outcome of the executing of the set of actions with a desired outcome. In one embodiment, the prediction by the critic network 412 may be a forward pass that involves the propagation of input data through the network's layers to produce an output, where each layer includes a set of nodes. Inside each neuron, the inputs from the previous layer may be combined in a linear transformation (e.g., inputs*weights+bias), and after the linear transformation, an activation function is applied to the output. Then the output will be used as input to nodes in the next layer.

Referring again to FIG. 11A, at 1106 the AI based controller 222A processes each of the set of actions to generate control signals for controlling the orientation of the satellite to stabilize the satellite when operating in a specific orientation scenario. The control signals may be utilized to activate or actuate one or more actuators that may help to stabilize the satellite 120. At 1108, the AI based controller 222A may control, based on the set of actions and the set of rewards, the orientation of the satellite to stabilize the satellite. When the reward is high it is indicative of the set of actions being taken in the right direction to stabilize the satellite by controlling the orientation or attitude of the satellite, which may result in generation of more such actions until the set of parameters are within the desired threshold values. When the reward is low it is indicative of the set of actions either are not affecting the orientation of the satellite or may cause further destabilization of the satellite, which results in modification of the set of actions until the right set of actions is predicted to stabilize the satellite and which may bring the set of parameters within the desired threshold values.

Figure 12:
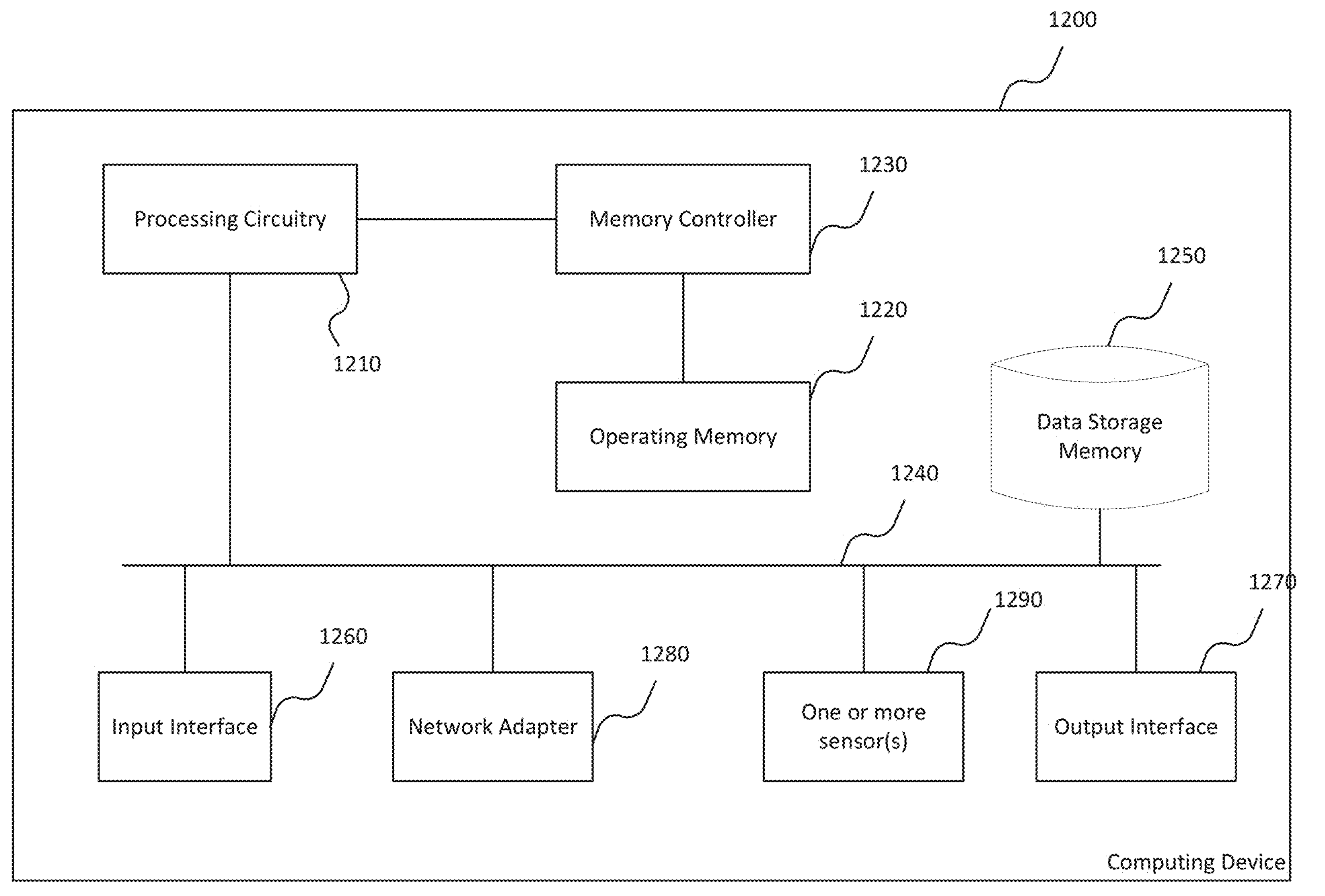
FIG. 12 is a diagram illustrating one example of computing device in which aspects of the technology may be practiced.

FIG. 12 is a diagram illustrating one example of computing device 1200 in which aspects of the technology may be practiced. Computing device 1200 may be virtually any type of general-purpose or specific-purpose computing device. For example, computing device 1200 may be an example of the flight computer 202 or a processor of the satellite 120, a computing system or device associated with the satellite 120 as described above with reference to FIGS. 1-11.

As illustrated in FIG. 12, computing device 1200 includes processing circuit 1210, operating memory 1220, memory controller 1230, data storage memory 1250, input interface 1260, output interface 1270, and network adapter 1280. Each of these afore-listed components of computing device 1200 includes at least one hardware element.

Computing device 1200 includes at least one processing circuit 1210 configured to execute instructions, such as instructions for implementing the herein-described workloads, processes, or technology. Processing circuit 1210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 1220 during run-time of computing device 1200. Operating memory 1220 may also include any of a variety of data storage devices/components, such as volatile memories, semi-volatile memories, random access memories, static memories, caches, buffers, or other media used to store run-time information. In one example, operating memory 1220 does not retain information when computing device 1200 is powered off. Rather, computing device 1200 may be configured to transfer instructions from a non-volatile data storage component (e.g., data storage component 1250) to operating memory 1220 as part of a booting or other loading process. In some examples, other forms of execution may be employed, such as execution directly from data storage component 1250.

Operating memory 1220 may include 4th generation double data rate (DDR4) memory, 3rd generation double data rate (DDR3) memory, other dynamic random access memory (DRAM), High Bandwidth Memory (HBM), Hybrid Memory Cube memory, 3D-staked memory, static random access memory (SRAM), magnetoresistive random access memory (MRAM), pseudorandom random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 1210 via memory controller 1230 in channels. One example of computing device 1200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 1220 specifically does not include or encompass communications media, any communications medium, or any signals per se.

Memory controller 1230 is configured to interface processing circuit 1210 to operating memory 1220. For example, memory controller 1230 may be configured to interface commands, addresses, and data between operating memory 1220 and processing circuit 1210. Memory controller 1230 may also be configured to abstract or otherwise manage certain aspects of memory management from or for processing circuit 1210. Although memory controller 1230 is illustrated as single memory controller separate from processing circuit 1210, in other examples, multiple memory controllers may be employed, memory controller(s) may be integrated with operating memory 1220, or the like. Further, memory controller(s) may be integrated into processing circuit 1210. These and other variations are possible.

In computing device 1200, data storage memory 1250, input interface 1260, output interface 1270, and network adapter 1280 are interfaced to processing circuit 1210 by bus 1240. Although, FIG. 12 illustrates bus 1240 as a single passive bus, other configurations, such as a collection of buses, a collection of point-to-point links, an input/output controller, a bridge, other interface circuitry, or any collection thereof may also be suitably employed for interfacing data storage memory 1250, input interface 1260, output interface 1270, or network adapter 1280 to processing circuit 1210.

In computing device 1200, data storage memory 1250 is employed for long-term non-volatile data storage. Data storage memory 1250 may include any of a variety of non-volatile data storage devices/components, such as non-volatile memories, disks, disk drives, hard drives, solid-state drives, or any other media that can be used for the non-volatile storage of information. However, data storage memory 1250 specifically does not include or encompass communications media, any communications medium, or any signals per se. In contrast to operating memory 1220, data storage memory 1250 is employed by computing device 1200 for non-volatile long-term data storage, instead of for run-time data storage.

Also, computing device 1200 may include or be coupled to any type of processor-readable media such as processor-readable storage media (e.g., operating memory 1220 and data storage memory 1250) and communication media (e.g., communication signals and radio waves). While the term processor-readable storage media includes operating memory 1220 and data storage memory 1250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 1200 also includes input interface 1260, which may be configured to enable computing device 1200 to receive input from users or from other devices. In addition, computing device 1200 includes output interface 1270, which may be configured to provide output from computing device 1200.

In the illustrated example, computing device 1200 is configured to communicate with other computing devices or entities via network adapter 1280. Network adapter 1280 may include a wired network adapter, e.g., an Ethernet adapter, a Token Ring adapter, or a Digital Subscriber Line (DSL) adapter. Network adapter 1280 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 1200 is illustrated with certain components configured in a particular arrangement, these components and arrangement are merely one example of a computing device in which the technology may be employed. In other examples, data storage memory 1250, input interface 1260, output interface 1270, or network adapter 1280 may be directly coupled to processing circuit 1210, or be coupled to processing circuit 1210 via an input/output controller, a bridge, or other interface circuitry. Other variations of the technology are possible.

Some examples of computing device 1200 include at least one memory (e.g., operating memory 1220) adapted to store run-time data and at least one processor (e.g., processing unit 1210) that is adapted to execute processor-executable code that, in response to execution, enables computing device 1200 to perform actions, where the actions may include, in some examples, actions for one or more methodologies or processes described herein, such as, methods of FIGS. 7, 8, 9, 10A-10D, and 11A-11C, as described above.

The device or system of the present disclosure may additionally include one or more sensor to sense or gather data pertaining to the surrounding environment or operation of the device or system. Some exemplary sensors capable of being electronically coupled with the device or system of the present disclosure (either directly connected to the device or system of the present disclosure or remotely connected thereto) may include but are not limited to: accelerometers sensing accelerations experienced during rotation, translation, velocity/speed, location traveled, elevation gained; gyroscopes sensing movements during angular orientation and/or rotation, and rotation; magnetometers measuring the magnetic field experienced or observed by the satellite; star trackers capturing images of stars and comparing them to known star charts to precisely determine the satellite's orientation; sun sensor detecting and measuring the direction of the Sun; Earth sensor measuring the satellite's orientation and determines its attitude or position with respect to the Earth's surface; altimeters sensing barometric pressure, altitude change, terrain climbed, local pressure changes, submersion in liquid; impellers measuring the amount of fluid passing thereby; Global Positioning and GNSS sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The device or system of the present disclosure may include wireless communication logic coupled to sensors on the device or system. The sensors gather data and provide the data to the wireless communication logic. Then, the wireless communication logic may transmit the data gathered from the sensors to a remote device. Thus, the wireless communication logic may be part of a broader communication system, in which one or several devices or systems of the present disclosure may be networked together to report alerts and, more generally, to be accessed and controlled remotely. Depending on the types of transceivers installed in the device or system of the present disclosure, the system may use a variety of protocols (e.g., Wifi, ZigBee, MiWi, Bluetooth) for communication. In one example, each of the devices or systems of the present disclosure may have its own IP address and may communicate directly with a router or gateway. This would typically be the case if the communication protocol is WiFi.

In another example, a point-to-point communication protocol like MiWi or ZigBee is used. One or more of the device or system of the present disclosure may serve as a repeater, or the devices or systems of the present disclosure may be connected together in a mesh network to relay signals from one device or system to the next. However, the individual device or system in this scheme typically would not have IP addresses of their own. Instead, one or more of the devices or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system also allows individuals to access the device or system of the present disclosure for configuration and diagnostic purposes. In that case, the individual processors or microcontrollers of the device or system of the present disclosure may be configured to act as Web servers that use a protocol like hypertext transfer protocol (HTTP) to provide an online interface that can be used to configure the device or system. In some embodiments, the systems may be used to configure several devices or systems of the present disclosure at once. For example, if several devices or systems are of the same model and are in similar locations in the same location, it may not be necessary to configure the devices or systems individually. Instead, an individual may provide configuration information, including baseline operational parameters, for several devices or systems at once.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic," as used herein, includes but is not limited to hardware, firmware, software, and/or combinations of each to perform a function(s) or an action(s), and/or to cause a function or action from another logic, method, and/or system. For example, based on a desired application or needs, logic may include a software-controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected," "attached" or "coupled" to another feature or element, it can be directly connected, attached, or coupled to the other feature or element or intervening features or elements may be present. In contrast, when a feature or element is referred to as being "directly connected," "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly," "downwardly," "vertical," "horizontal," "lateral," "transverse," "longitudinal," and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an example embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an example embodiment," "an exemplary embodiment," or "other embodiments," or the like, are not necessarily all referring to the same embodiments. References in the specification to "an embodiment," "one embodiment," "some embodiments," "one particular embodiment," "an example embodiment," "an exemplary embodiment," or "other embodiments," or the like, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

If this specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

The description and illustration of various embodiments of the disclosure are examples and the disclosure is not limited to the exact details shown or described. While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed:

1. A method for controlling a satellite, the method comprising:

receiving a set of parameters associated with an orientation of the satellite;

executing, based on each of the set of parameters, a reinforcement learning model to control the orientation of the satellite to stabilize the satellite, wherein the executing of the reinforcement learning model comprises:

reducing, by an omega agent, a value of each of the set of angular rates such that each of the set of angular rates is within a first predefined threshold;

reducing, by a Euler agent when each of the set of angular rates is within the first predefined threshold, a value of each of a set of Euler angles such that each of the set of Euler angles is within a second predefined threshold;

predicting, based on each of the set of parameters, a set of actions to be executed by the satellite to control the orientation of the satellite;

executing the set of actions; and predicting an outcome of the executing of the set of actions to generate a set of rewards; and controlling, based on the set of actions and the set of rewards, the orientation of the satellite to stabilize the satellite.

2. The method of claim 1, wherein the omega agent and the Euler agent execute the reinforcement learning model to reduce the values of the set of angular rates within the first predefined threshold and the set of Euler angles within the second predefined threshold.

3. The method of claim 2, wherein the omega agent and the Euler agent are each based on an actor-critic network, wherein each actor-critic network comprises:

an actor network; and a critic network.

4. The method of claim 2, wherein the reducing, by the omega agent, the value of each of the set of angular rates further comprises:

inputting the set of parameters into an actor network, wherein the set of parameters include the set of angular rates, a set of quaternions, and a position of the satellite;

processing, by the actor network, the set of parameters based on a policy to predict the set of actions;

executing the set of actions to determine the set of parameters of the satellite after executing the set of actions;

storing the set of parameters of the satellite after executing the set of actions in an experiment buffer;

adding noise to the set of actions;

inputting the set of parameters and the set of actions with added noise into a critic network; and predicting, by the critic network, the outcome of the executing of the set of actions to generate the set of rewards, wherein the set of rewards is generated by comparing the outcome of the executing of the set of actions with a desired outcome.

5. The method of claim 2, wherein the reducing, by the Euler agent, the value of each of the set of Euler angles further comprises:

inputting the set of parameters into an actor network, wherein the set of parameters include the set of angular rates, a set of quaternions, and a position of the satellite;

processing, by the actor network, the set of parameters based on a policy to predict the set of actions;

executing the set of actions to determine the set of parameters of the satellite;

storing the set of parameters of the satellite after executing the set of actions in an experiment buffer;

adding noise to the set of actions;

inputting the set of parameters and the set of actions with added noise into a critic network; and predicting, by the critic network, the outcome of the executing of the set of actions to generate the set of rewards, wherein the set of rewards is generated by comparing the outcome of the executing of the set of actions with a desired outcome.

6. The method of claim 1, wherein the reinforcement learning model is based on an actor-critic model.

7. The method of claim 1, further comprising:

processing each of the set of actions to generate control signals for controlling the orientation of the satellite to stabilize the satellite when operating in a specific orientation scenario.

8. The method of claim 1, wherein the set of rewards are generated by:

comparing the outcome of the executing of the set of actions and a desired outcome, when the outcome of executing a first action of the set of actions is within a predefined range of the desired outcome, a value of a first reward of the set of rewards corresponding to the first action is high, and when the outcome of executing the first action of the set of actions exceeds the predefined range of the desired outcome, the value of the first reward of the set of rewards corresponding to the first action is low.

9. A method for implementing a reinforcement learning model for controlling a satellite, the method comprising:

receiving a set of parameters associated with an orientation of the satellite; and implementing, based on each of the set of parameters, the reinforcement learning model to control the orientation of the satellite to stabilize the satellite, wherein the implementing of the reinforcement learning model comprises:

reducing, by an omega agent, a value of each of a set of angular rates such that each of the set of angular rates is within a first predefined threshold;

reducing, by a Euler agent when each of the set of angular rates is within the first predefined threshold, a value of each of a set of Euler angles such that each of the set of Euler angles is within a second predefined threshold;

predicting, based on each of the set of parameters, a set of actions to be implemented by the satellite to control the orientation of the satellite;

implementing the set of actions; and predicting an outcome of the implementing of the set of actions to generate a set of rewards, wherein the orientation of the satellite is controllable, based on the set of actions and the set of rewards, to stabilize the satellite.

10. The method of claim 9, wherein the omega agent and the Euler agent execute the reinforcement learning model to reduce the values of the set of angular rates within the first predefined threshold and the set of Euler angles within the second predefined threshold.

11. The method of claim 10, wherein the omega agent and the Euler agent are each based on an actor-critic network, and wherein each actor-critic network comprises:

an actor network; and a critic network.

12. The method of claim 10, wherein the reducing, by the omega agent, the value of each of the set of angular rates further comprises:

sampling a first subset of parameters of the set of parameters from a demonstration buffer and a second subset of parameters of the set of parameters from an experiment buffer, wherein the set of parameters include the set of angular rates, a set of quaternions, and a position of the satellite;

inputting the set of parameters into an actor network;

processing, by the actor network, the set of parameters based on a policy to predict the set of actions;

simulating, by a simulation environment processor, the set of actions to determine the set of parameters of the satellite after simulating the set of actions;

storing the set of parameters of the satellite after simulating the set of actions in the experiment buffer;

adding noise to the set of actions;

inputting the set of parameters and the set of actions with added noise into a critic network; and predicting, by the critic network, the outcome of the implementing of the set of actions to generate the set of rewards, wherein the set of rewards are generated by comparing the outcome of the implementing of the set of actions with a desired outcome.

13. The method of claim 10, wherein the reducing, by the Euler agent, the value of each of the set of Euler angles further comprises:

sampling the set of parameters from an experiment buffer, wherein the set of parameters include the set of angular rates, a set of quaternions, and a position of the satellite;

inputting the set of parameters and a set of control actions into an actor network, wherein the set of control actions are generated by a controller;

processing, by the actor network, the set of parameters and the set of control actions based on a policy to predict the set of actions and a weight value;

simulating, by a simulation environment processor, the set of actions and the set of control actions based on the weight value to determine the set of parameters of the satellite after simulating the set of actions and the set of control actions;

storing the set of parameters of the satellite after simulating the set of actions and the set of control actions in the experiment buffer;

adding noise to the set of actions;

inputting the set of parameters and the set of actions with added noise into a critic network; and predicting, by the critic network, the outcome of the implementing of the set of actions to generate the set of rewards, wherein the set of rewards are generated by comparing the outcome of the implementing of the set of actions with a desired outcome.

14. The method of claim 9, wherein the reinforcement learning model is based on an actor-critic model.

15. A method for implementing a reinforcement learning model for controlling a satellite, the method comprising:

receiving a set of parameters associated with an orientation of the satellite; and implementing, based on each of the set of parameters, the reinforcement learning model to control the orientation of the satellite to stabilize the satellite, wherein the implementing of the reinforcement learning model comprises:

predicting, based on each of the set of parameters, a set of actions to be implemented by the satellite to control the orientation of the satellite;

implementing the set of actions; and predicting an outcome of the implementing of the set of actions to generate a set of rewards, wherein the orientation of the satellite is controllable, based on the set of actions and the set of rewards, to stabilize the satellite;

capturing, by a simulation environment processor, a plurality of trajectories for the satellite during different orientation scenarios in different simulation environments, wherein each trajectory comprises data that represents a particular orientation of the satellite at a particular time;

retrieving, by the reinforcement learning model, a set of trajectories of the satellite; and processing, by the reinforcement learning model, the set of trajectories of the satellite to learn and generate the set of parameters that describe the orientation of the satellite, wherein the set of parameters are processible by an agent to generate the set of actions for controlling the satellite.

16. The method of claim 15, wherein the different orientation scenarios correspond to different initial values of omega associated with the satellite.

17. The method of claim 9, wherein the set of rewards are generated by:

comparing the outcome of the implementing of the set of actions and a desired outcome, when the outcome of implementing a first action of the set of actions is within a predefined range of the desired outcome, a value of a first reward of the set of rewards corresponding to the first action is high, and when the outcome of implementing the first action of the set of actions exceeds the predefined range of the desired outcome, the value of the first reward of the set of rewards corresponding to the first action is low.

18. A system for controlling a satellite, the system comprising:

at least one hardware-based processor and memory, wherein the memory comprises processor-executable instructions encoded on a non-transient processor-readable media, wherein the processor-executable instructions, when executed by the processor, configure the system to:

receive a set of parameters associated with an orientation of the satellite;

execute, based on each of the set of parameters, a reinforcement learning model to control the orientation of the satellite to stabilize the satellite, wherein the executing of the reinforcement learning model comprises:

reduce, by an omega agent, a value of each of a set of angular rates such that each of the set of angular rates is within a first predefined threshold;

reduce, by a Euler agent when each of the set of angular rates is within the first predefined threshold, a value of each of a set of Euler angles such that each of the set of Euler angles is within a second predefined threshold;

predict, based on each of the set of parameters, a set of actions to be executed by the satellite to control the orientation of the satellite;

execute the set of actions; and predict an outcome of the executing of the set of actions to generate a set of rewards; and control, based on the set of actions and the set of rewards, the orientation of the satellite to stabilize the satellite.

19. A system for implementing a reinforcement learning model for controlling a satellite, the system comprising:

at least one hardware-based processor and memory, wherein the memory comprises processor-executable instructions encoded on a non-transient processor-readable media, wherein the processor-executable instructions, when executed by the processor, are configurable to configure the system to:

receive a set of parameters associated with an orientation of the satellite; and implement, based on each of the set of parameters, the reinforcement learning model to control the orientation of the satellite to stabilize the satellite, wherein the implementing of the reinforcement learning model comprises:

reduce, by an omega agent, a value of each of a set of angular rates such that each of the set of angular rates is within a first predefined threshold;

reduce, by a Euler agent when each of the set of angular rates is within the first predefined threshold, a value of each of a set of Euler angles such that each of the set of Euler angles is within a second predefined threshold;

predict, based on each of the set of parameters, a set of actions to be implemented by the satellite to control the orientation of the satellite;

implement the set of actions; and predict an outcome of the implementing of the set of actions to generate a set of rewards, wherein the orientation of the satellite is controllable, based on the set of actions and the set of rewards, to stabilize the satellite.

20. A non-transitory computer-readable medium storing a set of instructions for implementing a reinforcement learning model for controlling a satellite, the set of instructions comprising:

one or more instructions that, when executed by one or more processors of a device, cause the device to:

receive a set of parameters associated with an orientation of the satellite; and implement, based on each of the set of parameters, the reinforcement learning model to control the orientation of the satellite to stabilize the satellite, wherein the implementing of the reinforcement learning model comprises:

reduce, by an omega agent, a value of each of a set of angular rates such that each of the set of angular rates is within a first predefined threshold;

reduce, by a Euler agent when each of the set of angular rates is within the first predefined threshold, a value of each of a set of Euler angles such that each of the set of Euler angles is within a second predefined threshold;

predict, based on each of the set of parameters, a set of actions to be implemented by the satellite to control the orientation of the satellite;

implement the set of actions; and predict an outcome of the implementing of the set of actions to generate a set of rewards, wherein the orientation of the satellite is controllable, based on the set of actions and the set of rewards, to stabilize the satellite.

21. A non-transitory computer-readable medium storing a set of instructions for controlling a satellite, the set of instructions comprising:

one or more instructions that, when executed by one or more processors of a device, cause the device to:

receive a set of parameters associated with an orientation of the satellite;

execute, based on each of the set of parameters, a reinforcement learning model to control the orientation of the satellite to stabilize the satellite, wherein the executing of the reinforcement learning model comprises:

reduce, by an omega agent, a value of each of a set of angular rates such that each of the set of angular rates is within a first predefined threshold;

reduce, by a Euler agent when each of the set of angular rates is within the first predefined threshold, a value of each of a set of Euler angles such that each of the set of Euler angles is within a second predefined threshold;

predict, based on each of the set of parameters, a set of actions to be executed by the satellite to control the orientation of the satellite;

execute the set of actions; and predict an outcome of the executing of the set of actions to generate a set of rewards; and control, based on the set of actions and the set of rewards, the orientation of the satellite to stabilize the satellite.

* * * * *